United States Patent
Ueda

(10) Patent No.: US 8,669,833 B2
(45) Date of Patent: Mar. 11, 2014

(54) THREE-DIMENSIONAL METAMATERIAL HAVING FUNCTION OF ALLOWING AND INHIBITING PROPAGATION OF ELECTROMAGNETIC WAVES

(75) Inventor: Tetsuya Ueda, Kyoto (JP)

(73) Assignee: National University Corporation Kyoto University of Technology, Kyoto (JP)

( * ) Notice: Subject to any disclaimer, the term of this patent is extended or adjusted under 35 U.S.C. 154(b) by 269 days.

(21) Appl. No.: 13/375,945

(22) PCT Filed: Jun. 3, 2010

(86) PCT No.: PCT/JP2010/059437
§ 371 (c)(1),
(2), (4) Date: Dec. 2, 2011

(87) PCT Pub. No.: WO2010/140655
PCT Pub. Date: Dec. 9, 2010

(65) Prior Publication Data
US 2012/0105970 A1  May 3, 2012

(30) Foreign Application Priority Data
Jun. 5, 2009 (JP) ................. 2009-136417

(51) Int. Cl.
*H01P 1/205* (2006.01)
*H01P 7/10* (2006.01)
(52) U.S. Cl.
USPC ........................................ 333/202; 333/219.1
(58) Field of Classification Search
USPC .............. 333/202, 206, 219, 219.1, 222, 227
See application file for complete search history.

(56) References Cited

U.S. PATENT DOCUMENTS

| 7,538,946 B2 | 5/2009 | Smith et al. |
| 7,864,114 B2 | 1/2011 | Sanada |
| 8,149,181 B2 * | 4/2012 | Yen et al. .................. 343/911 R |
| 8,525,618 B2 * | 9/2013 | Toujo ............................ 333/185 |
| 2003/0137362 A1 * | 7/2003 | Matsui et al. ................ 333/99 S |
| 2008/0212920 A1 | 9/2008 | Engheta et al. |
| 2010/0118412 A1 | 5/2010 | Sanada |

FOREIGN PATENT DOCUMENTS

| JP | 2006-114489 | 4/2006 |
| JP | 3928055 | 3/2007 |
| JP | 2008-503776 | 2/2008 |

(Continued)

OTHER PUBLICATIONS

Th. Koschny et al., "Isotropic three-dimensional left-handed metamaterials", Physical Review B, vol. 71, pp. 121103-1 through 121103-4, Mar. 2005.

(Continued)

*Primary Examiner* — Dean O Takaoka
*Assistant Examiner* — Alan Wong

(57) ABSTRACT

In a metamaterial, a dielectric layer includes a host medium and dielectric bodies disposed in rows with predetermined intervals therebetween is sandwiched between a pair of conductive mesh plates each having holes, thereby forming a functional layer including dielectric resonators corresponding to the dielectric bodies. The metamaterial is configured by laminating the functional layers. The holes and the dielectric resonators are positioned coaxially and an electromagnetic wave is propagated in each of the functional layers in a propagation direction perpendicular to a multi-layered laminate surface such that the metamaterial function as a left-handed metamaterial in relation to the propagation direction perpendicular to the multi-layered surface.

7 Claims, 19 Drawing Sheets

(56) References Cited

FOREIGN PATENT DOCUMENTS

| JP | 2008-507733 | 3/2008 |
|----|-------------|--------|
| JP | 2008-244683 | 10/2008 |
| JP | 2008-252293 | 10/2008 |
| WO | 03/087904 | 10/2003 |

OTHER PUBLICATIONS

Anthony Grbic et al., "An isotropic three-dimensional negative-refractive-index transmission-line metamaterial", Journal of Applied Physics, vol. 98, pp. 043106-1 through 043106-5, Aug. 2005.

Pekka Alitalo et al., "Three-dimensional isotropic perfect lens based on LC-loaded transmission lines", Journal of Applied Physics, vol. 99, pp. 064912-1 through 064912-8, Mar. 2006.

Michael Zedler et al., "A 3-D Isotropic Left-Handed Metamaterial Based on the Rotated Transmission-Line Matrix (TLM) Scheme", IEEE Transactions on Microwave Theory and Techniques, vol. 55, No. 12, pp. 2930-2941, Dec. 2007.

Christopher L. Holloway et al., "A Double Negative (DNG) Composite Medium Composed of Magnetodielectric Spherical Particles Embedded in a Matrix", IEEE Transactions on Antennas and Propagation, vol. 51, No. 10, pp. 2596-2601, Oct. 2003.

Orest G. Vendik et al., "Artificial Double Negative (DNG) Media Composed by Two Different Dielectric Sphere Lattices Embedded in a Dielectric Matrix", Proceedings of Europe Microwave Conference, pp. 1209-1212, Oct. 2004.

L. Jylha et al., "Modeling of isotropic backward-wave materials composed of resonant spheres", Journal of Applied Physics, vol. 99, pp. 043102-1 through 043102-7, Feb. 2006.

Elena A. Semouchkina et al., "FDTD Study of Resonance Processes in Metamaterials", IEEE Transactions on Microwave Theory Technology, vol. 53, No. 4, pp. 1477-1486, Apr. 2005.

Tetsuya Ueda et al., "Three-Dimensional Negative-Refractive-Index Meta-Materials Composed of Spherical Dielectric Resonators", USI National Radio Science 2006 Meeting, p. 51, Jan. 2006.

Tetsuya Ueda et al., Dielectric-Resonator-Based Composite Right/Left-Handed Transmission Lines and Their Application to Leaky Wave Antenna, IEEE Transactions on Microwave Theory and Techniques, vol. 56, No. 10, pp. 2259-2269, Oct. 2008.

Tetsuya Ueda et al., "2.5-D Stacked Composite Right/Left-Handed Metamaterial Structures Using Dielectric Resonators and Parallel Mesh Plates", IEEE MTT-S International Microwave Symposium Digest, pp. 335-338, Jun. 2008.

L. Lewin, "The Electrical Constants of a Material Loaded with Spherical Particles", Proceedings of Institute Electrical Engineering, vol. 94, part III, pp. 65-68, 1947.

R. Marques et al., "Left-Handed-Media Simulation and Transmission of EM Waves in Subwavelength Split-Ring-Resonator-Loaded Metallic Waveguides", Physical Review Letters, The American Physical Society, vol. 89, No. 18, pp. 183901-1 through 183901-4, Oct. 2002.

J.B. Pendry et al., "Negative Refraction Makes a Perfect Lens", Physical Review Letters, The American Physical Society, vol. 85, No. 18, pp. 3966-3969, Oct. 2000.

Tetsuya Ueda et al., "Composite Right/Left Handed Metamaterial Structures Composed of Dielectric Resonators and Parallel Mesh Plates", Microwave Symposium, IEEE/MTT-S International, vol. 6, pp. 1823-1826, 2007.

Translation of International Preliminary Report on Patentability issued Jan. 26, 2012 in International (PCT) Application No. PCT/JP2010/059437.

* cited by examiner

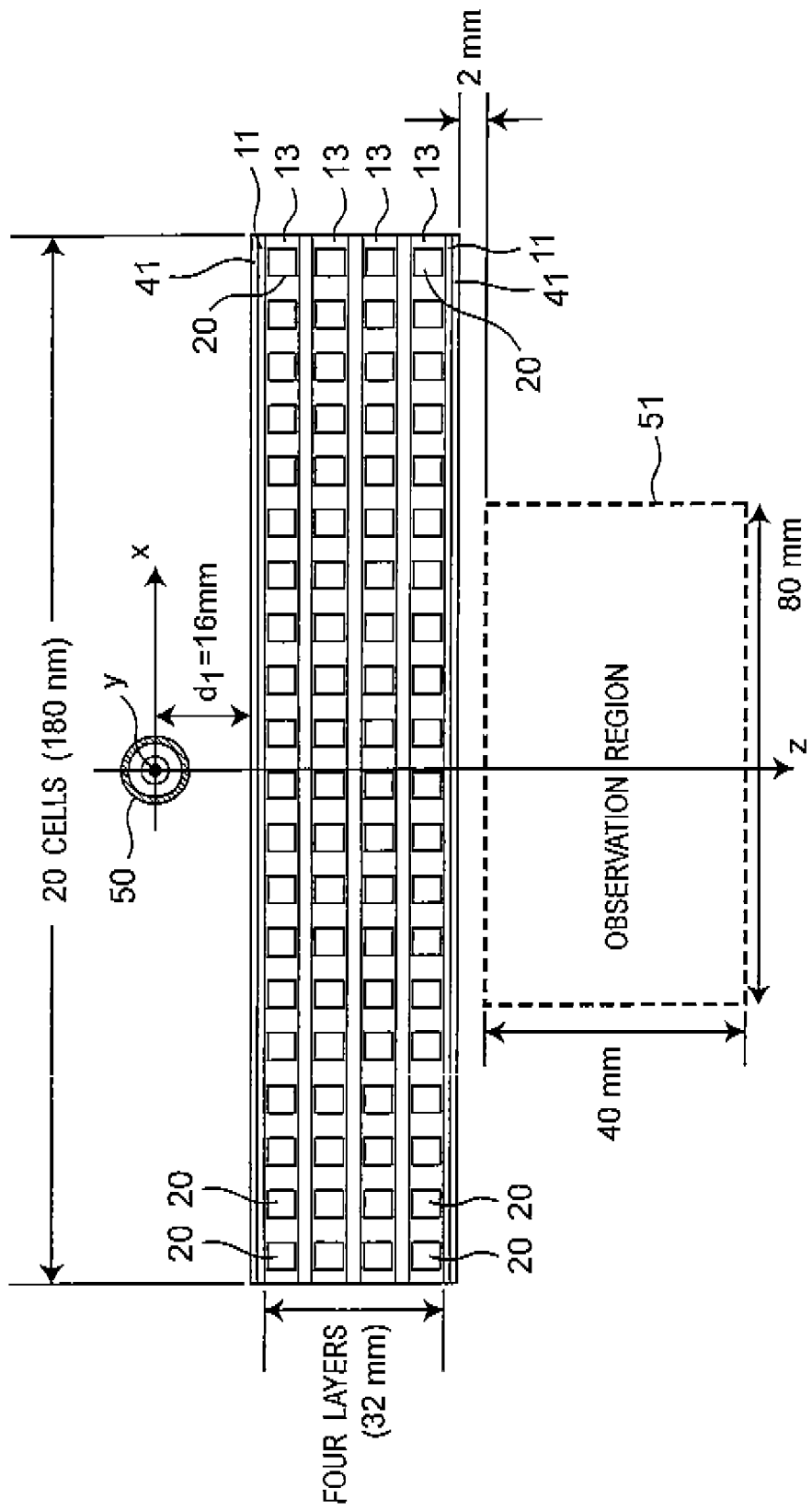

THREE-DIMENSIONAL METAMATERIAL HAVING FUNCTION OF ALLOWING AND INHIBITING PROPAGATION OF ELECTROMAGNETIC WAVES

TECHNICAL FIELD

The present invention relates to a metamaterial (artificial structure) apparatus (hereinafter, referred to as a metamaterial) having a function of allowing and inhibiting propagation of electromagnetic waves, and relates, in particular, to a three-dimensional composite right-handed and left-handed metamaterial in which the effective permittivity of the same structure is positive, negative or zero and, on the other hand, the effective permeability has a positive, negative or zero value. Hereinafter, terms of "the right-handed and the left-handed" are referred to as a "right-handed/left-handed".

BACKGROUND ART

The metamaterial structures have been researched for applications to microwave circuits and their components and antennas, flat-plate super-lenses, near field imaging having a resolving power smaller than the wavelength, optical devices and their components of a cloaking technique or the like. The left-handed metamaterial simultaneously has a negative effective permittivity and a negative effective permeability and enables the propagation of backward waves. The majority of the applications of microwave circuits or antennas are based on a one-dimensional or two-dimensional left-handed metamaterial structure. Lately, a combination of split ring resonators and thin wires, and anisotropic/isotropic left-handed structures that use transmission line networks and dielectric spheres are also proposed.

In the metamaterial structure, the right-handed system indicates an electromagnetic wave propagation state in which the electric field vector, the magnetic field vector and the wave number vector of electromagnetic waves constitute the right-handed system, and also indicates the propagation state of forward waves (forward traveling waves) such that the direction of the transmitted power of electromagnetic waves (direction of the group velocity) and the direction of the flow of the phase plane (direction of the phase velocity) are directed in an identical direction. This state is possible in media and structures in which the effective permittivity and the effective permeability both have positive values.

Moreover, in the metamaterial structure, the left-handed system indicates an electromagnetic wave propagation state in which the electric field vector, the magnetic field vector and the wave number vector have relations that constitute the left-handed system, and also indicates the propagation state of backward waves (backward traveling waves) such that the direction of the transmitted power of electromagnetic waves and the direction of the flow of the phase plane are directed in opposite directions. This state is possible in media and structures in which the effective permittivity and the effective permeability both have negative values.

Several constituting methods of metamaterials are proposed, and the two of resonant type metamaterials and transmission line (non-resonant) type metamaterials can be enumerated as representative examples.

The former resonant type metamaterials are configured of combinations of magnetic and electric resonators that respond to the magnetic-field and electric-field components of external electromagnetic fields as represented by a combination of split ring resonators configured to include metal strips and thin wires. This structure, in which the effective permittivity or the effective permeability exhibits an anti-resonance characteristic, therefore receives a very large influence from a loss in the vicinity of the resonant frequency.

On the other hand, the latter transmission line type metamaterial has its structure configured by using the fact that the general electromagnetic wave propagation form can be described by a transmission line model. In contrast to the fact that the conventional one-dimensional right-handed metamaterial structure that permits forward wave propagation takes a ladder type structure in which inductive elements are inserted in the series branch and the capacitive elements are inserted in the parallel branch (shunt branch), the one-dimensional left-handed metamaterial structure takes a structure in which the capacitive elements are inserted in the series branch and the inductive elements are inserted in the parallel branch in order to make the values of the effective permittivity and the effective permeability negative. The majority of the transmission line type metamaterials, which exhibit no anti-resonance characteristics in the effective permittivity and permeability, therefore have a feature that they have a lower loss than that of the resonance type. The transmission line type metamaterial, which operates as a right-handed metamaterial, a left-handed metamaterial, a single negative metamaterial such that either one of the permittivity and the permeability becomes negative and the other becomes positive or a metamaterial such that the effective permittivity or permeability is zero depending on the operating frequency band, are therefore called the composite right-handed/left-handed metamaterials.

The frequencies at which the effective permittivity and the effective permeability of the composite right-handed/left-handed metamaterial each having a value of zero are generally different from each other. In the above case, in a band between the frequency at which the adjacent effective permittivity is zero and the frequency at which the effective permeability is zero, the frequencies being adjacently located, either one of the effective permittivity and the effective permeability is negative, and the other has a positive value. In this case, the propagation condition of electromagnetic waves is not satisfied, and a forbidden band is formed. The metamaterial operates as a left-handed metamaterial in the band on the downside of this forbidden band since the effective permittivity and the effective permeability are both negative or operates as a right-handed metamaterial in the band on the upside where both of them have positive values. When the frequencies at which the effective permittivity and the effective permeability are zero coincide with each other, no forbidden band is formed, and the left-handed transmission band and the right-handed transmission band are continuously connected. Such a metamaterial is called the balanced composite right-handed/left-handed metamaterial, and the other is called the unbalanced composite right-handed/left-handed metamaterial. The balanced composite right-handed/left-handed metamaterial has the features that the forbidden band is not generated, and also the group velocity does not become zero even at the frequency at which the phase constant is zero, allowing efficient transfer of power to be achieved.

PRIOR ART DOCUMENTS

Patent Documents:
Patent Document 1: Japanese patent No. JP3928055;
Patent Document 2: Japanese patent laid-open publication No. JP 2008-252293 A;
Patent Document 3: Japanese patent laid-open publication No. JP 2008-244683 A;
Patent Document 4: Japanese patent laid-open publication No. JP 2006-114489 A;

Patent Document 5: Japanese patent laid-open publication No. JP 2008-507733 A; and Patent Document 6: Japanese patent laid-open publication No. JP 2008-503776 A.

Non-Patent Documents:

Non-Patent Document 1: T. Koschny et al., "Isotropic three-dimensional left-handed metamaterials", Physical Review B, Vol. 71, pp. 121103-1-121103-4, March 2005;

Non-Patent Document 2: A. Grbic et al., "An isotropic three-dimensional negative-refractive-index transmission line metamaterial", Journal of Applied Physics, Vol. 98, pp. 043106-1-043106-5, August 2005;

Non-Patent Document 3: P. Alitalo et al., "Three-dimensional isotropic perfect lens based on LC-loaded transmission lines", Journal of Applied Physics, Vol. 99, pp. 064912-1-064912-8, March 2006;

Non-Patent Document 4: M. Zedler et al., "A 3-D isotropic left-handed metamaterial based on the rotated transmission-line matrix (TLM) scheme", IEEE Transactions on Microwave Theory and Techniques, Vol. 55, No. 12, pp. 2930-2941, December 2007;

Non-Patent Document 5: C. L. Holloway et al., "A double negative (DNG) composite medium composed of magneto-dielectric spherical particles embedded in a matrix", IEEE Transactions on Antennas and Propagation, Vol. 51, No. 10, pp. 2596-2601, October 2003;

Non-Patent Document 6: O. G. Vendik et al., "Artificial double negative (DNG) media composed by two different dielectric sphere lattices embedded in a dielectric matrix", in Proceedings of Europe Microwave Conference, pp. 1209-1212, October 2004;

Non-Patent Document 7: L. Jylha et al., "Modeling of isotropic backward-wave materials composed of resonant spheres", Journal of Applied Physics, Vol. 99, 043102, February 2006;

Non-Patent Document 8: E. A. Semouchkina et al., "FDTD study of resonance processes in metamaterials", IEEE Transactions on Microwave Theory Technology, Vol. 53, No. 4, pp. 1477-1486, April 2005;

Non-Patent Document 9: T. Ueda et al., "Three-dimensional negative-refractive-index metamaterials composed of spherical dielectric resonators", URSI National Radio Science 2006 Meeting, p. 51, January 2006;

Non-Patent Document 10: T. Ueda et al., "Dielectric-resonator-based composite right/left handed transmission lines and their application to leaky wave antenna", IEEE Transactions on Microwave Theory and Techniques, Vol. 56, No. 10, pp. 2259-2269, October 2008;

Non-Patent Document 11: T. Ueda et al., "2.5-D stacked composite right/left handed metamaterial structures using dielectric resonators and parallel mesh plates", in IEEE MTT-S International Microwave Symposium Digest, pp. 335-338, June 2008;

Non-Patent Document 12: L. Lewin, "The electrical constants of a material loaded with spherical particles", Proceedings of Institute Electrical Engineering, Vol. 94, Part III, pp. 65-68, 1947;

Non-Patent Document 13: R. Marques et al., "Left handed media simulation and transmission of EM waves in sub-wavelength SRR-loaded metallic waveguides", Physical Review. Letters, The American Physical Society, Vol. 89, No. 18, 183901-1-4, October 2002; and Non-Patent Document 14: J. B. Pendry, "Negative Refraction makes a perfect lens", Physical Review. Letters, The American Physical Society, Vol. 85, No. 18, pp. 3966-3969, October 2000.

SUMMARY OF THE INVENTION

Technical Problem

As the three-dimensional structure of the left-handed metamaterial, the following several operable constituting methods have already been proposed.

(1) A three-dimensional structure configured to include split ring resonators and metal thin wires or similar structures based on the same idea (See, for example, the Non-Patent Document 1).

(2) A network-shaped structure in which the transmission lines are three-dimensionally arranged and connected or 2) a network-shaped structure in which the transmission lines are three-dimensionally arranged and connected (See, for example, the Non-Patent Documents 2 and 3).

(3) A three-dimensional structure of a mushroom structure (normally having a two-dimensional structure) proposed on the basis of the three-dimensional equivalent circuit network method (3-DTLM (Three-Dimensional Transmission Line Method)) (See, for example, the Non-Patent Document 4), which is similar to structure of the above item (2).

(4) An amorphous structure in which two types of dielectric spheres are combined together (See, for example, the Non-Patent Documents 5, 6 and 7).

The metamaterial structure of the above item (1) is the resonant type, which has a large propagation loss as described above. Moreover, the metamaterial structures of the above items (2) and (3) are of the transmission line type, which needs to arrange inductive elements and capacitive elements of the lumped element or distributed types in predetermined branches of a complicated network structure although it has a lower loss than that of the resonant type, and is accompanied by great difficulties in manufacturing. Further, in the metamaterial structure of the item (4), there has been a problem that the structure parameters need to be adjusted to make the effective permittivity and the effective permeability negative in an identical frequency band when resonators of two types that respond electrically and magnetically are set to have substantially the same operating frequencies and spheres are distributed in an amorphous state at a certain density.

For the purpose of reducing the conductor losses at higher frequencies, the left-handed metamaterials using dielectric resonators are proposed in various configurations of dielectric resonators of two types (See, for example, the Non-Patent Documents 5, 6 and 7) and the configuration that uses dielectric resonators of one type and the mutual coupling (See, for example, the Non-Patent Documents 8 and 9) and so on. However, these constituting methods are extremely sensitive to variations in the constituent parameters. As an alternative proposal, the present inventor proposed a configuration in which dielectric resonators of one type are arranged in a background medium (or a background structure) that has a negative permittivity. This is configured to include a one-dimensional or two-dimensional array of dielectric resonators of the fundamental TE resonant mode inserted in the TE cutoff parallel-plate waveguide in the microwave region.

Further, the present inventor and others proposed the aforementioned structure of one-dimensional, two-dimensional and multi-layered type 2.5-dimensional balanced composite right-handed/left-handed metamaterial configured to include the aforementioned dielectric resonators of one type and mesh plates, and provided the opportunity of a new application concerning radiation systems of antennas or the like and coupling systems of power dividers or the like (See, for example, the Non-Patent Documents 10 and 11). However, there has been such a problem that the supported composite right-handed/left-handed transmission is limited to a transmission direction in a plane parallel to the layers even with the 2.5-dimensional multi-layered structure, and the perpendicular direction is not supported.

An object of the present invention is to solve the aforementioned problems and provide a three-dimensional metamaterial, which has a propagation loss smaller than in the prior art and is extremely easily manufactured and operable as a left-handed metamaterial in the propagation direction perpendicular to the layer plane by propagating electromagnetic waves in a propagation direction perpendicular to the layer plane in each functional layer.

Solution to Problem

According to a three-dimensional metamaterial of the present invention, there is provided a three-dimensional metamaterial configured by sandwiching a dielectric layer that includes a plurality of dielectrics aligned at predetermined intervals and a host medium between a pair of conductive mesh plates each of which has a plurality of holes, thereby forming a functional layer including a plurality of dielectric resonators corresponding to the plurality of dielectrics, and multi-layering the plurality of functional layers. In the metamaterial, axes of the plurality of holes and axes of the plurality of dielectric resonators are arranged coaxially to each other. Electromagnetic waves are propagated in a propagation direction perpendicular to a plane of layers in each of the functional layers, thereby allowing the metamaterial to operate as a left-handed metamaterial in the propagation direction perpendicular to the plane of the layers.

In the above-mentioned three-dimensional metamaterial, a size of the plurality of holes is set so that the plurality of holes have a negative effective permittivity and a positive effective permeability under such a condition that the dielectrics becomes such a resonant state that the dielectrics have a magnetic dipole moment at least parallel to the plane of layers when electromagnetic waves are made incident on the plurality of dielectric resonators in a direction substantially perpendicular to the plane of layers via the plurality of holes at a predetermined operating frequency. A shape, a size, a relative permittivity and an interval of the dielectric resonators, a relative permittivity of the host medium, and a thickness of the dielectric layer are set so that the dielectric layers have a positive effective permittivity and a negative effective permeability under the condition at the operating frequency. The shape, the size, the relative permittivity and the interval of the dielectric resonators, the relative permittivity of the host medium, the thickness of the dielectric layer and a thickness of the conductive mesh plates are set so that the effective permittivity and the effective permeability of the metamaterial both become negative under the condition at the operating frequency.

In addition, in the above-mentioned three-dimensional metamaterial, a unit cell is configured by forming a dielectric resonator by sandwiching the dielectric between a pair of conductive mesh plates each having a hole, and a plurality of the unit cells are aligned at predetermined intervals in a two-dimensional direction parallel to the plurality of conductive mesh plates and multi-layered in a direction perpendicular to the conductive mesh plates.

Further, in the above-mentioned three-dimensional metamaterial, a plurality of holes are formed at a first dielectric substrate, and the dielectric is inserted to protrude and stuffed in a plurality of holes of a second dielectric substrate that has a plurality of holes having a configuration identical to that of the first dielectric substrate. One of the dielectric layers is formed by fitting the first dielectric substrate into the second dielectric substrate so that the protruding dielectrics are inserted and stuffed respectively in the plurality of holes of the first dielectric substrate. One of the functional layers is formed by sandwiching the formed dielectric layer between a pair of conductive mesh plates, and a plurality of the functional layers is multi-layered.

Furthermore, in the above-mentioned three-dimensional metamaterial, the metamaterial is configured, so that a frequency when the effective permeability thereof becomes zero is set to be equal to a frequency when the effective permittivity thereof becomes zero, in a propagation direction of electromagnetic waves which is a direction perpendicular to the conductive mesh plates, thereby operating the metamaterial as a balanced right-handed/left-handed metamaterial.

Still further, in the above-mentioned three-dimensional metamaterial, a composite right-handed and left-handed metamaterial is configured by making electromagnetic waves incident so that the electromagnetic waves have a polarization direction and a propagation direction in a direction parallel to the conductive mesh plates.

Still more further, in the above-mentioned three-dimensional metamaterial, the plurality of dielectrics are aligned to be close to each other so that the mutually adjacent dielectrics in the dielectric layers are magnetically coupled with each other, thereby operating the metamaterial as a left-handed metamaterial even when electromagnetic waves are made incident into the metamaterial so that the electromagnetic waves have a propagation direction in a direction parallel to the conductive mesh plates and has a polarization in a direction perpendicular to the conductive mesh plates.

Advantageous Effects of the Invention

According to the three-dimensional metamaterial of the present invention, the three-dimensional metamaterial can be configured, which has a propagation loss smaller than in the prior art and is extremely easily manufactured and operable as a left-handed metamaterial in the propagation direction perpendicular to the layer plane by propagating electromagnetic waves in a propagation direction perpendicular to the layer plane in each functional layer.

Figure 2:
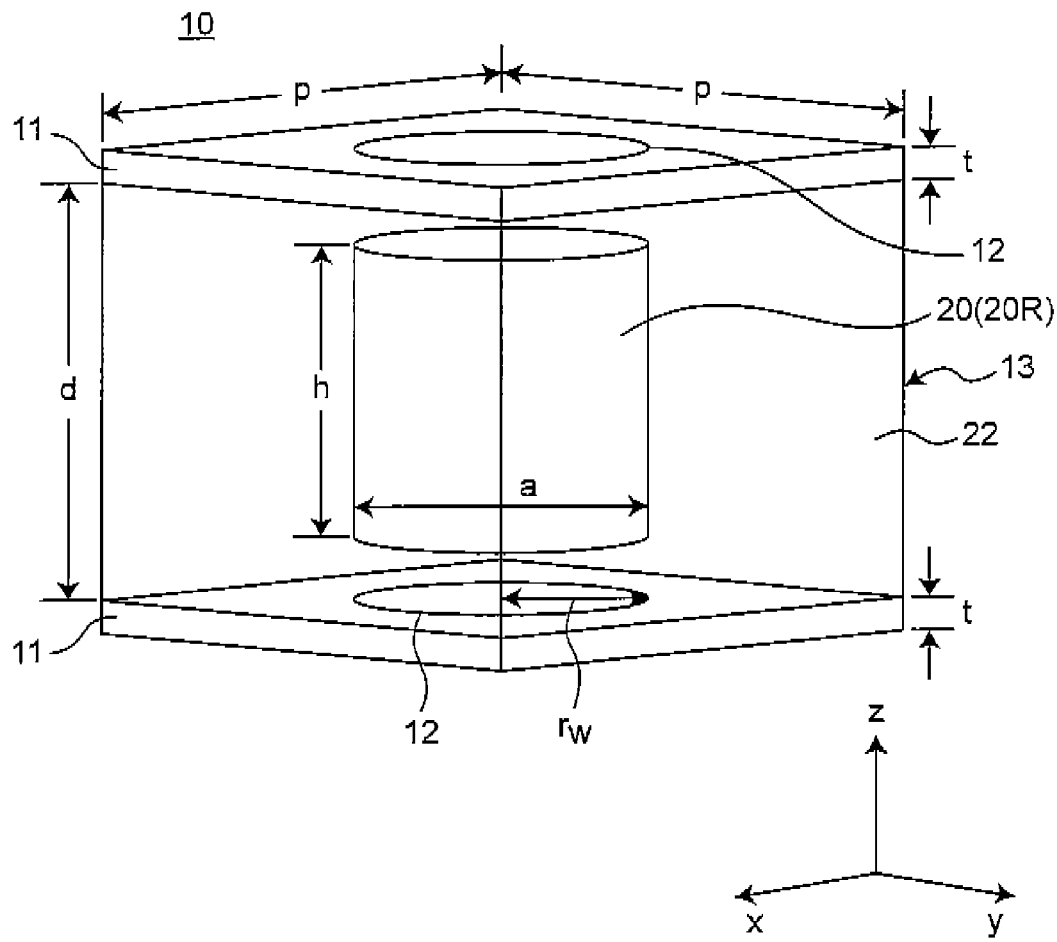
FIG. 2 is a perspective view showing a configuration of a unit cell of the three-dimensional composite right-handed/left-handed metamaterial of FIG. 1.
Figure 3A:
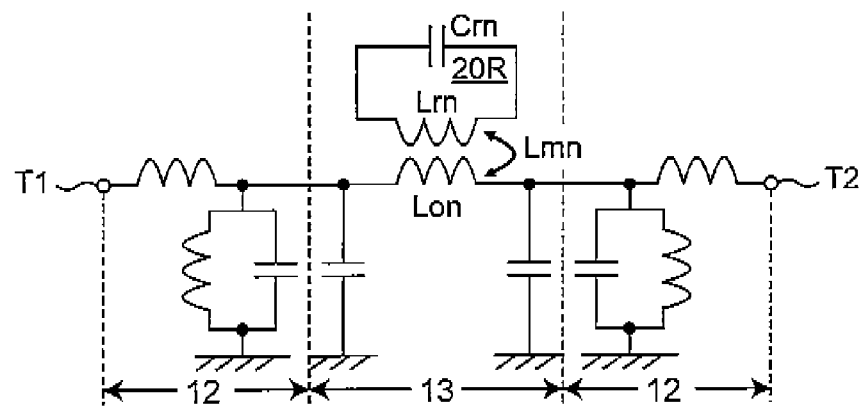
FIG. 3A is a circuit diagram showing an equivalent circuit model of the unit cell of the composite right-handed/left-handed metamaterial of FIG. 2 proposed in a different propagation case, and a circuit diagram showing an equivalent circuit model of the unit cell of the composite right-handed/left-handed metamaterial proposed in a first case of propagation in the z direction perpendicular to a plurality of layers multi-layered by using an $HE_{11\delta}$ resonant mode of a dielectric resonator 20R.
Figure 3B:
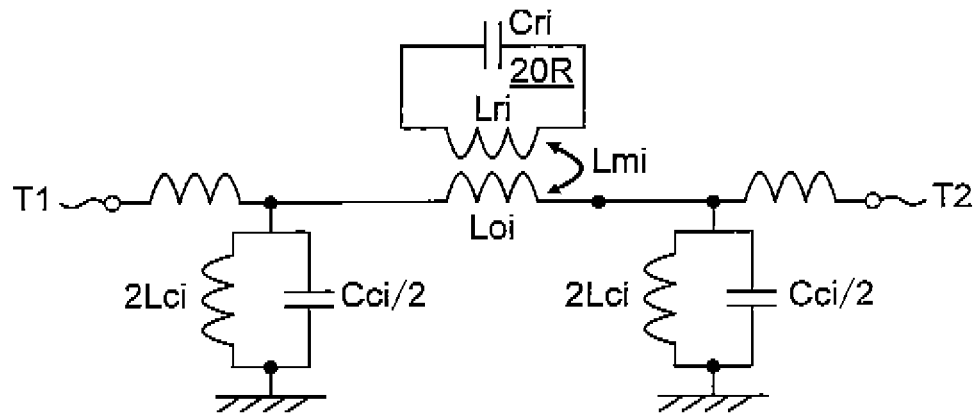
FIG. 3B is a circuit diagram showing an equivalent circuit model of the unit cell of the composite right-handed/left-handed metamaterial of FIG. 2 proposed in a different propagation case, and a circuit diagram showing an equivalent circuit model of the unit cell of the composite right-handed/ left-handed metamaterial proposed in a second case of propagation in the x direction of y polarized wave by using the $TE_{01\delta}$ resonant mode of the dielectric resonator 20R.
Figure 3C:
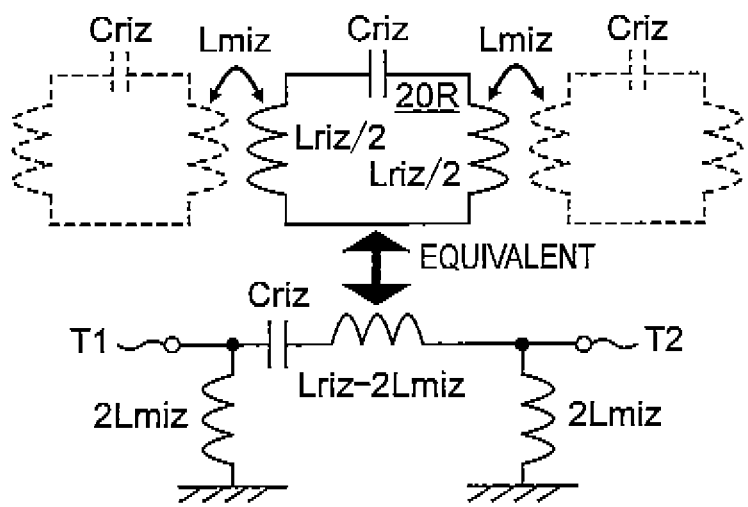

FIG. 3C is a circuit diagram showing an equivalent circuit model of the unit cell of the composite right-handed/left-handed metamaterial of FIG. 2 proposed in a different propagation case, and a circuit diagram showing an equivalent circuit model of the unit cell of the composite right-handed/left-handed metamaterial proposed in a third case of in-plane propagation of z polarized wave by using the $HE_{11\delta}$ resonant mode of the dielectric resonator 20R.

Figure 4:
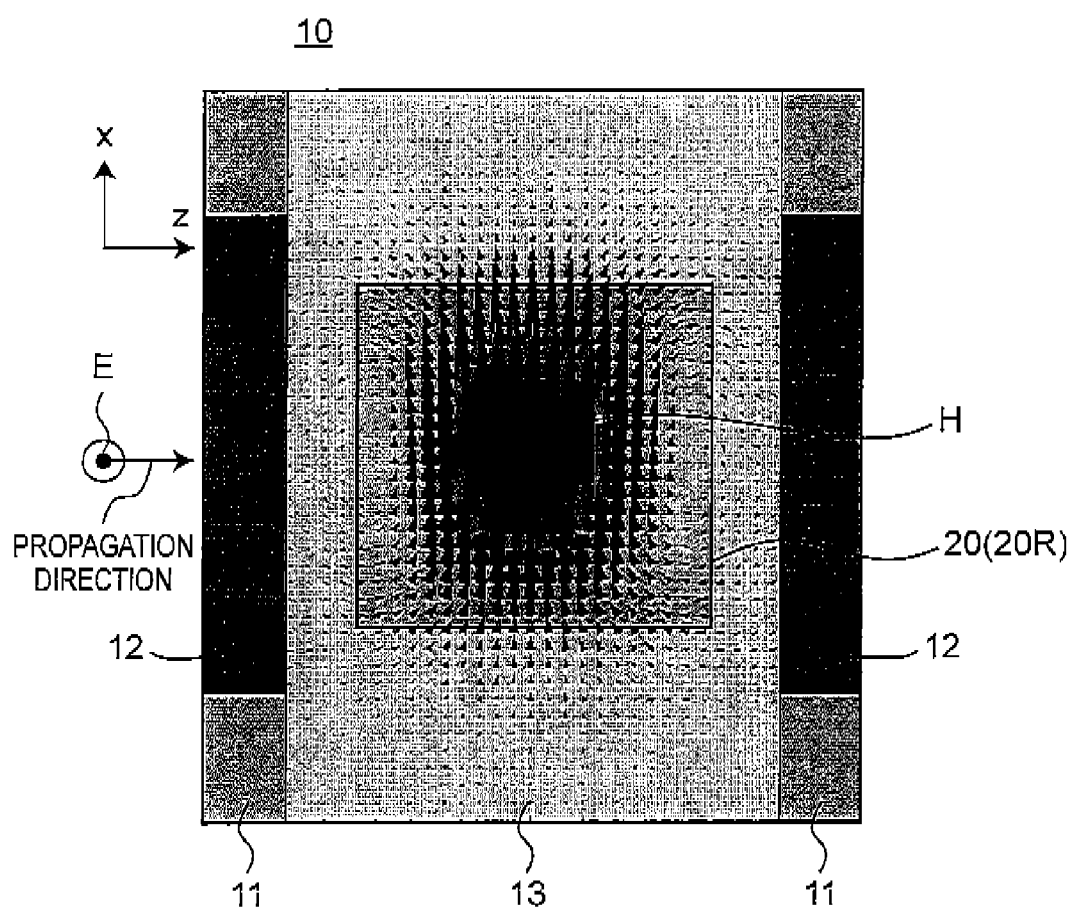

FIG. 4 is a schematic longitudinal sectional view of a unit cell 10 showing an input electric field vector E and a magnetic field distribution including an excitation magnetic field vector H in the resonator in the first case of FIG. 3A.

Figure 5:
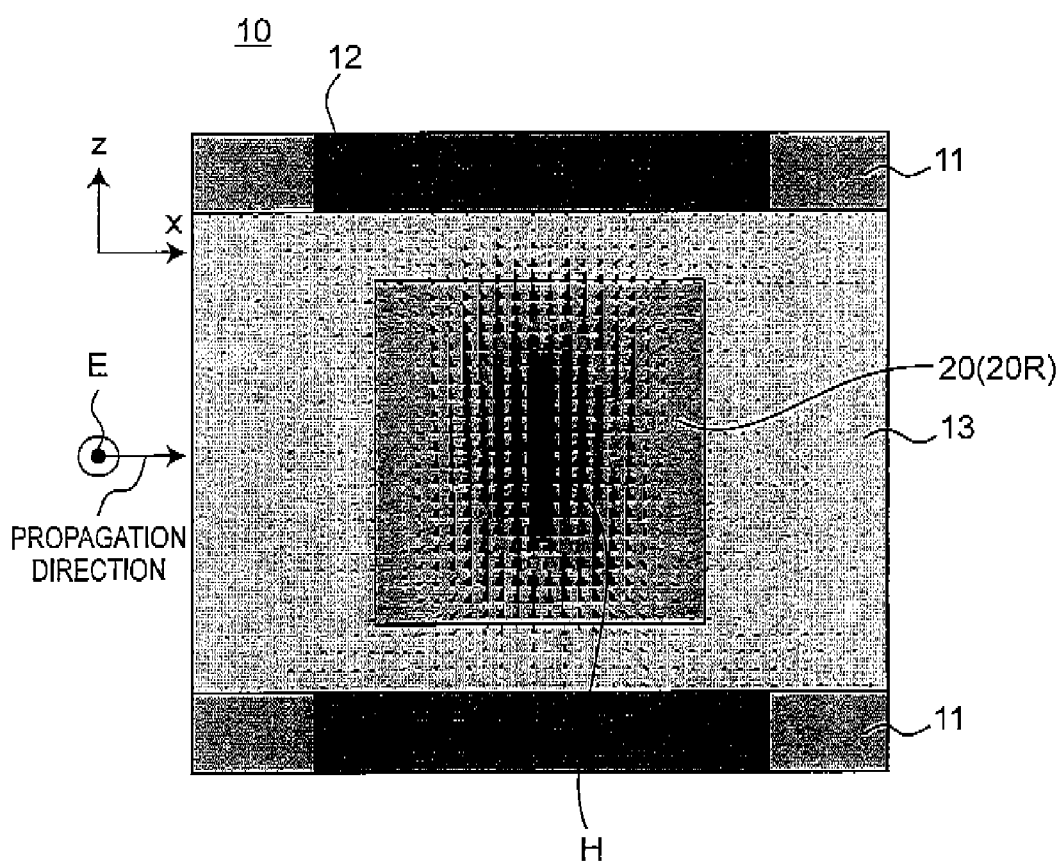

FIG. 5 is a schematic longitudinal sectional view of a unit cell 10 showing an input electric field vector E and a magnetic field distribution including an excitation magnetic field vector H in the resonator in the second case of FIG. 3B.

Figure 6:
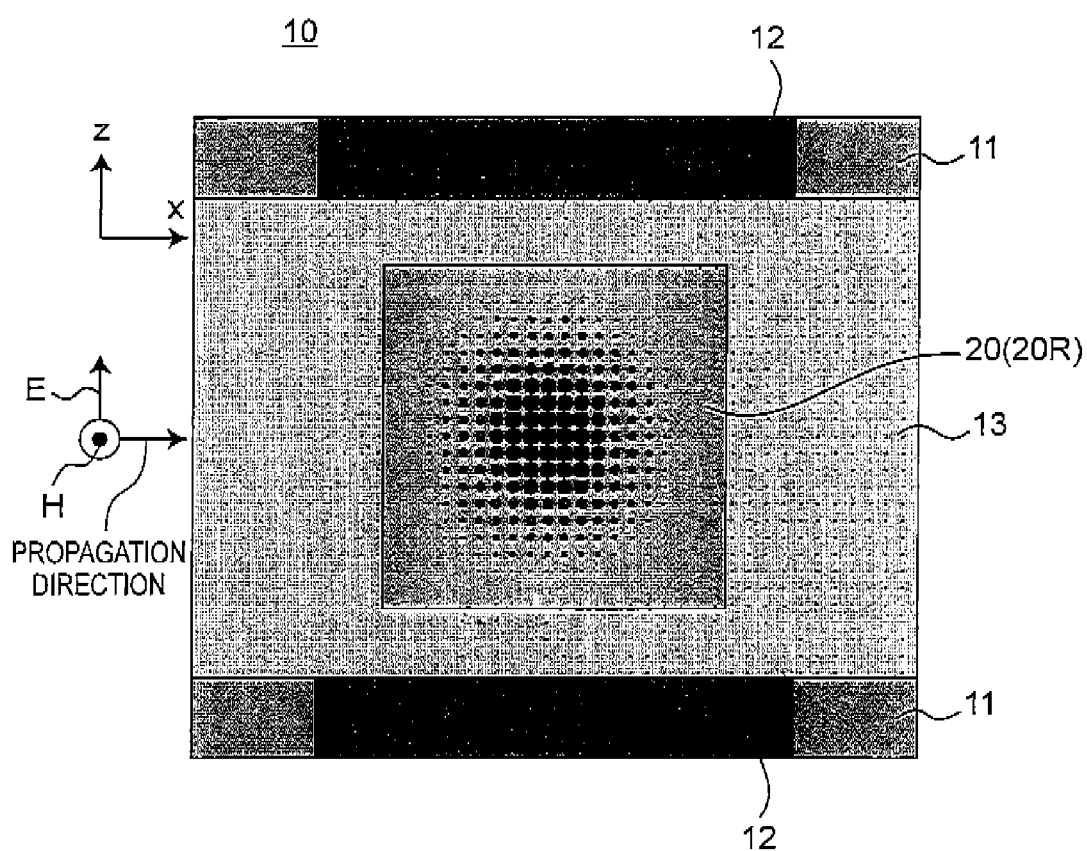

FIG. 6 is a schematic longitudinal sectional view of a unit cell 10 showing an input electric field vector E and a magnetic field distribution including an excitation magnetic field vector H in the resonator in the third case of FIG. 3C.

Figure 7A:
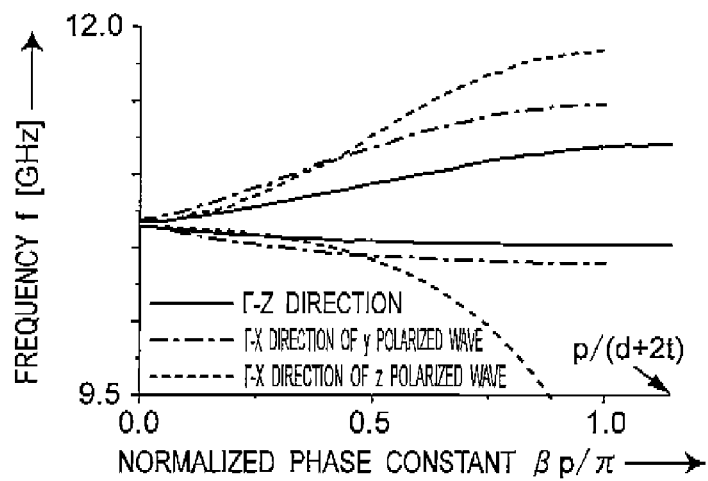

FIG. 7A is a graph showing dispersion frequency characteristics in a case where a dielectric layer 13 has a height "d"=6 mm, an electrically conductive mesh plate 11 has a thickness "t"=0.5 mm, one side has a length "p"=8 mm, and a conductive mesh hole 12 has a radius $r_w$=2.1 mm in the unit cell 10 of the three-dimensional balanced composite right-handed/left-handed metamaterial of FIG. 2.

Figure 7B:
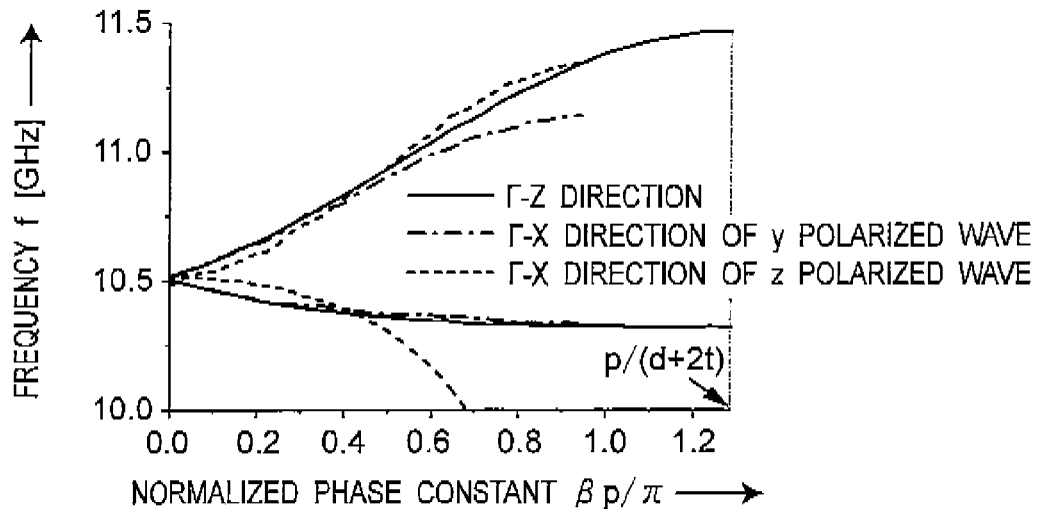

FIG. 7B is a graph showing dispersion frequency characteristics in a case where the dielectric layer 13 has a height "d"=6 mm, the conductive mesh plate 11 has a thickness "t"=0.5 mm, one side has a length "p"=9 mm, and the conductive mesh hole 12 has a radius $r_w$=2.6 mm in the unit cell 10 of the three-dimensional balanced composite right-handed/left-handed metamaterial of FIG. 2.

Figure 7C:
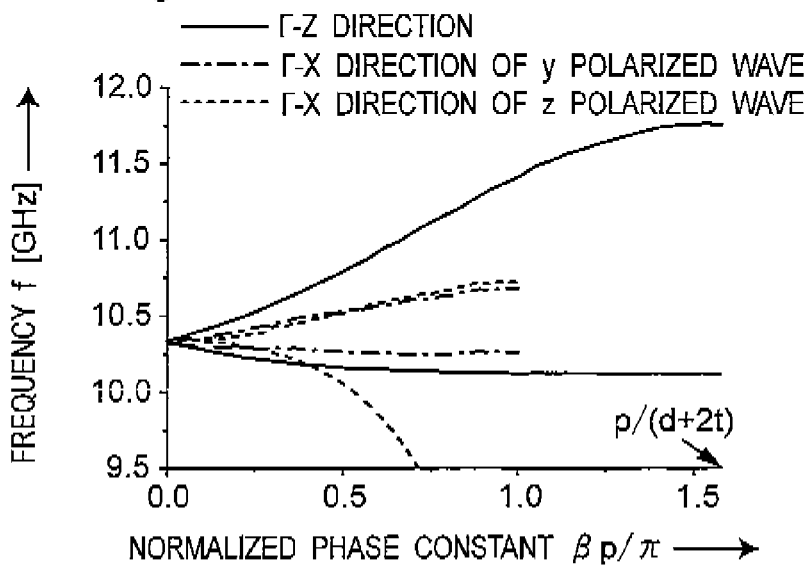

FIG. 7C is a graph showing dispersion frequency characteristics in a case where the dielectric layer 13 has a height "d"=6 mm, the conductive mesh plate 11 has a thickness "t"=0.5 mm, one side has a length "p"=11 mm, and the conductive mesh hole 12 has a radius $r_w$=3.15 mm in the unit cell 10 of the three-dimensional balanced composite right-handed/left-handed metamaterial of FIG. 2.

Figure 8:
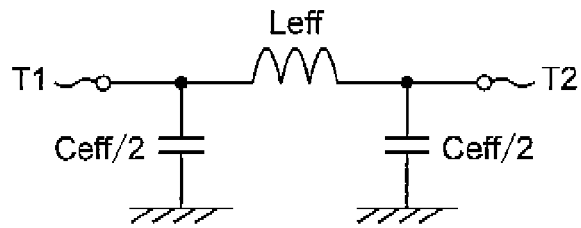

FIG. 8 is a circuit diagram of a symmetric π-type equivalent circuit showing a series branch element and a parallel branch element of the unit cell 10 of the three-dimensional balanced composite right-handed/left-handed metamaterial of FIG. 2.

Figure 9A:
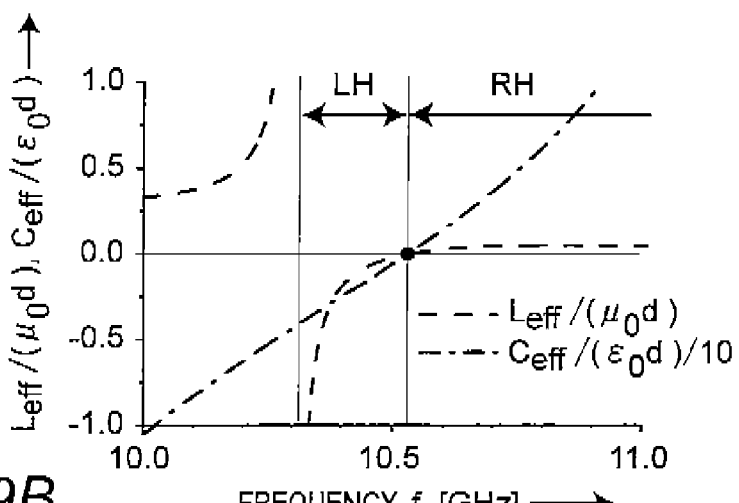

FIG. 9A is a graph showing normalized values of the series branch element (effective inductance Leff) and the parallel branch element (effective capacitance Ceff/2) in the propagation in the z direction perpendicular to a plurality of layers multi-layered in a case where one side has a length "p"=9 mm, the dielectric layer 13 has a height "d"=6 mm, the conductive mesh plate 11 has a thickness "t"=0.5 mm, and the conductive mesh hole 12 has a radius $r_w$=2.6 mm in the symmetric π-type equivalent circuit of the unit cell 10 of FIG. 2.

Figure 9B:
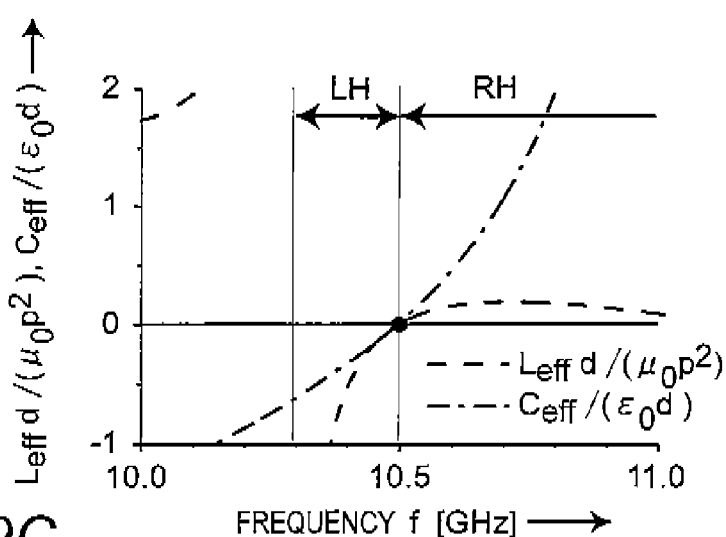

FIG. 9B is a graph showing normalized values of the series branch element (effective inductance Leff) and the parallel branch element (effective capacitance Ceff/2) in the propagation in the x direction of y polarized wave in a case where one side has a length "p"=9 mm, the dielectric layer 13 has a height "d"=6 mm, the conductive mesh plate 11 has a thickness "t"=0.5 mm, and the conductive mesh hole 12 has a radius $r_w$=2.6 mm in the symmetric π-type equivalent circuit of the unit cell 10 of FIG. 2.

Figure 9C:
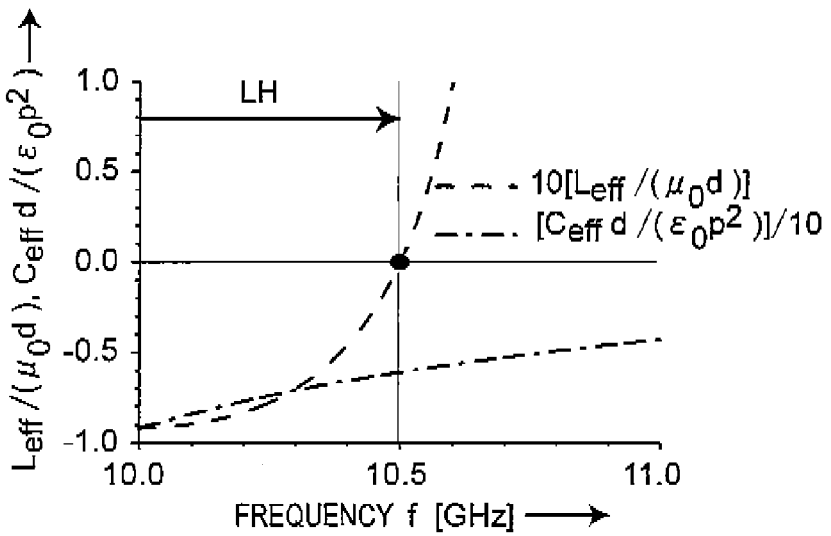

FIG. 9C is a graph showing normalized values of the series branch element (effective inductance Leff) and the parallel branch element (effective capacitance Ceff/2) in the in-plane propagation of z polarized wave in a case where one side has a length "p"=9 mm, the dielectric layer 13 has a height "d"=6 mm, the conductive mesh plate 11 has a thickness "t"=0.5 mm, and the conductive mesh hole 12 has a radius $r_w$=2.6 mm in the symmetric π-type equivalent circuit of the unit cell 10 of FIG. 2.

Figure 10A:
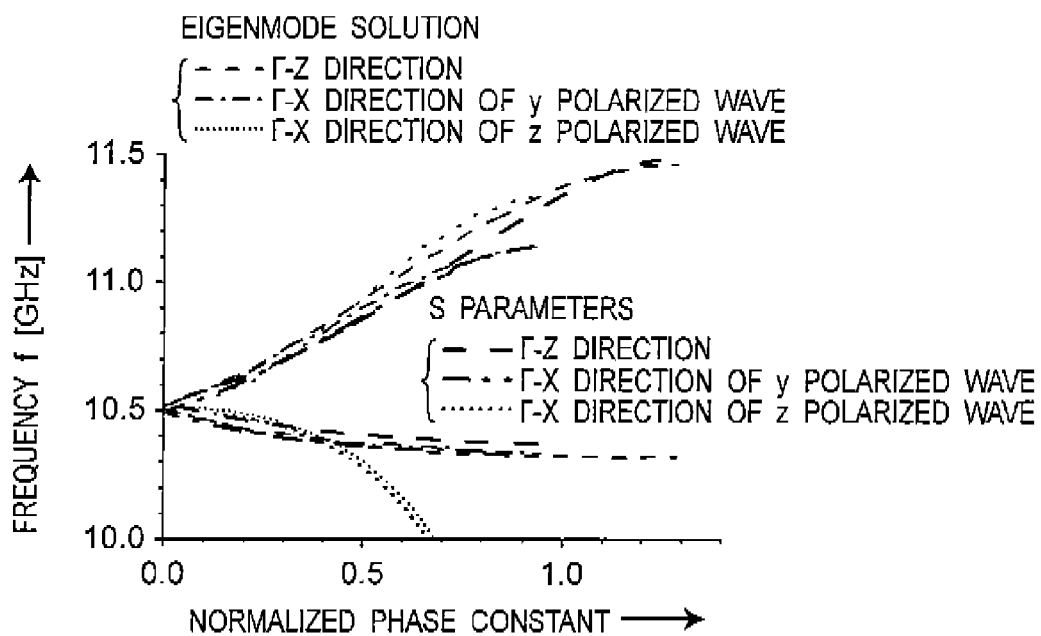

FIG. 10A is a graph showing dispersion frequency characteristics extracted by an S parameters simulated in a case where one side has a length "p"=9 mm, the dielectric layer 13 has a height "d"=6 mm, the conductive mesh plate 11 has a thickness "t"=0.5 mm, and the conductive mesh hole 12 has a radius $r_w$=2.6 mm in the unit cell 10 of FIG. 2.

Figure 10B:
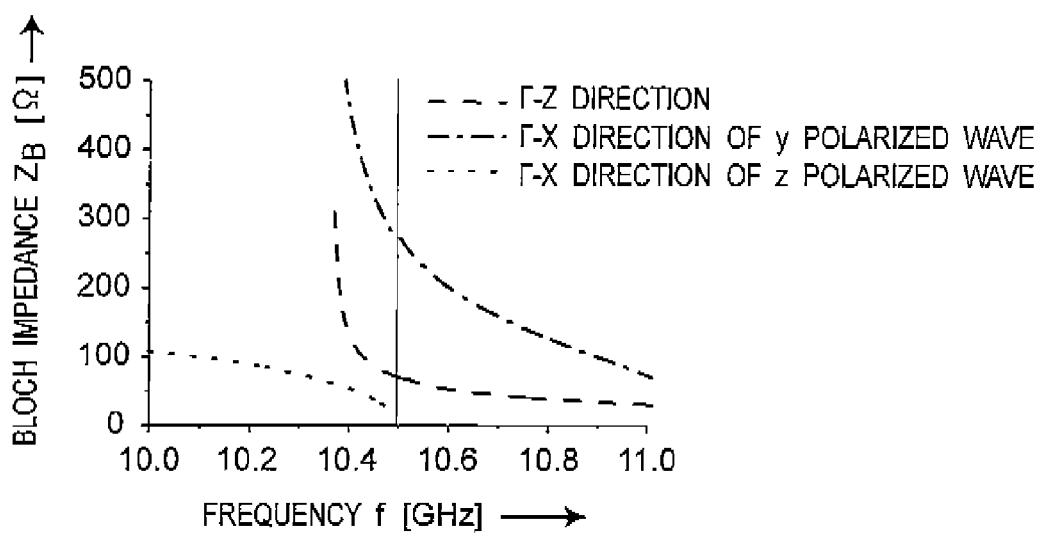

FIG. 10B is a graph showing frequency characteristics of Bloch impedance extracted by the S parameters simulated in a case where one side has a length "p"=9 mm, the dielectric layer 13 has a height "d"=6 mm, the conductive mesh plate 11 has a thickness "t"=0.5 mm, and the conductive mesh hole 12 has a radius $r_w$=2.6 mm in the unit cell 10 of FIG. 2.

Figure 11:
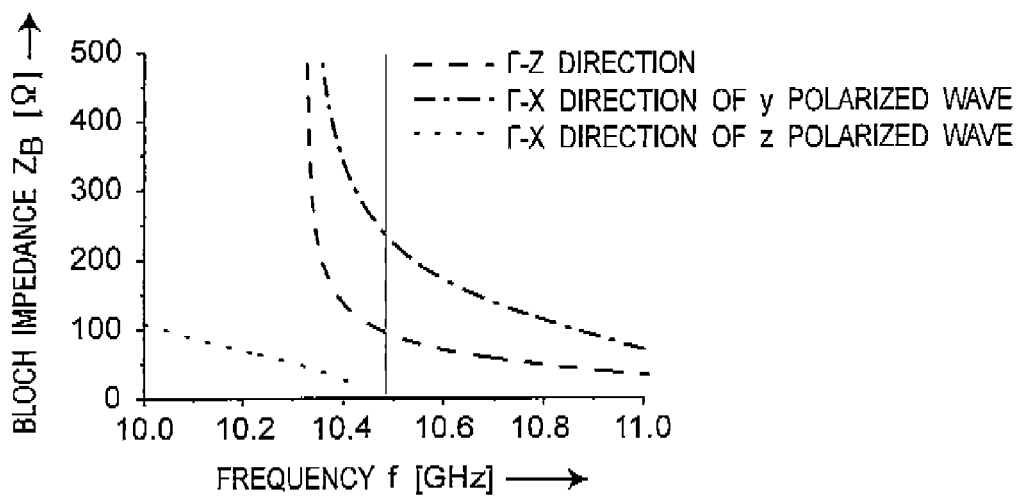

FIG. 11 is a graph showing frequency characteristics of Bloch impedance extracted by the S parameters simulated in a case where one side has a length "p"=9 mm, the dielectric layer 13 has a height "d"=6 mm, the conductive mesh plate 11 has a thickness "t"=1.0 mm, and the conductive mesh hole 12 has a radius $r_w$=2.95 mm in the unit cell 10 of FIG. 2.

Figure 12:
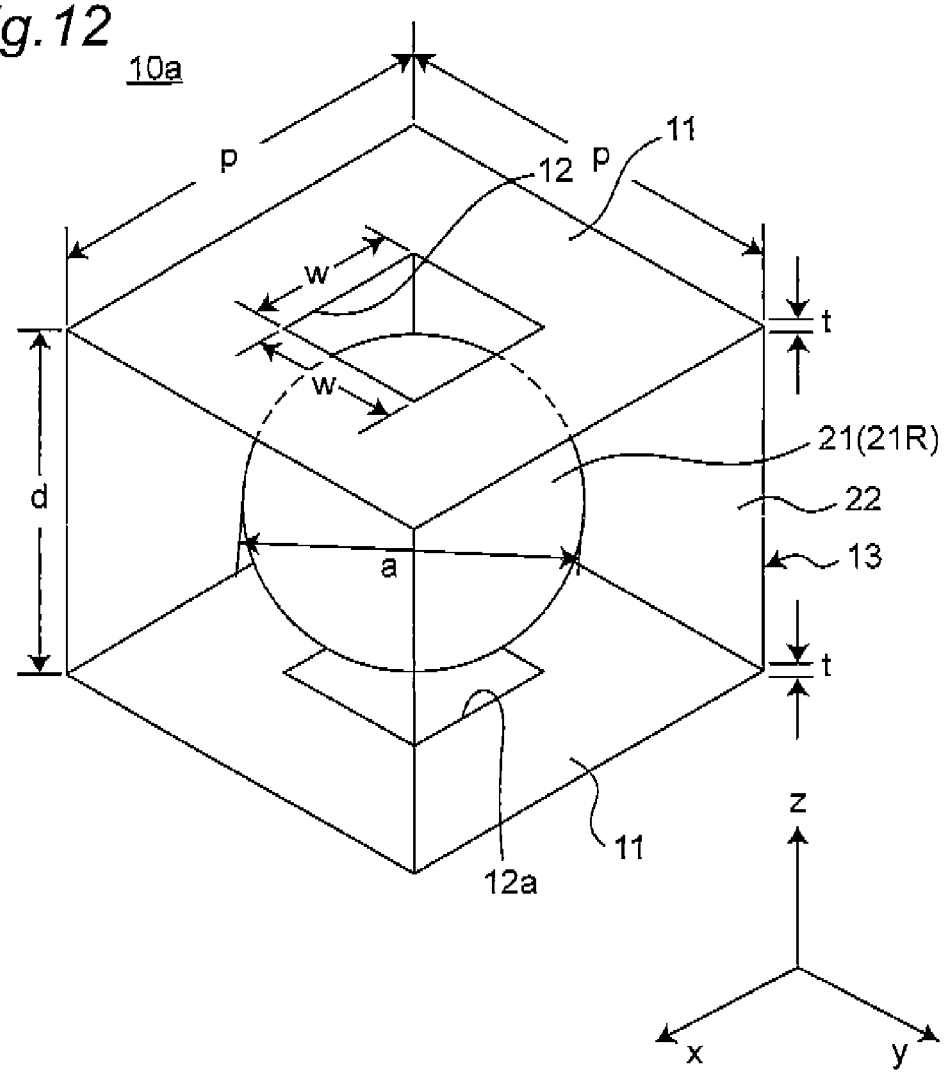

FIG. 12 is a perspective view showing a configuration of the unit cell 10a of a three-dimensional composite right-handed/left-handed metamaterial that uses a spherical dielectric 21 according to a second implemental example (modified embodiment) of the present invention.

Figure 13:
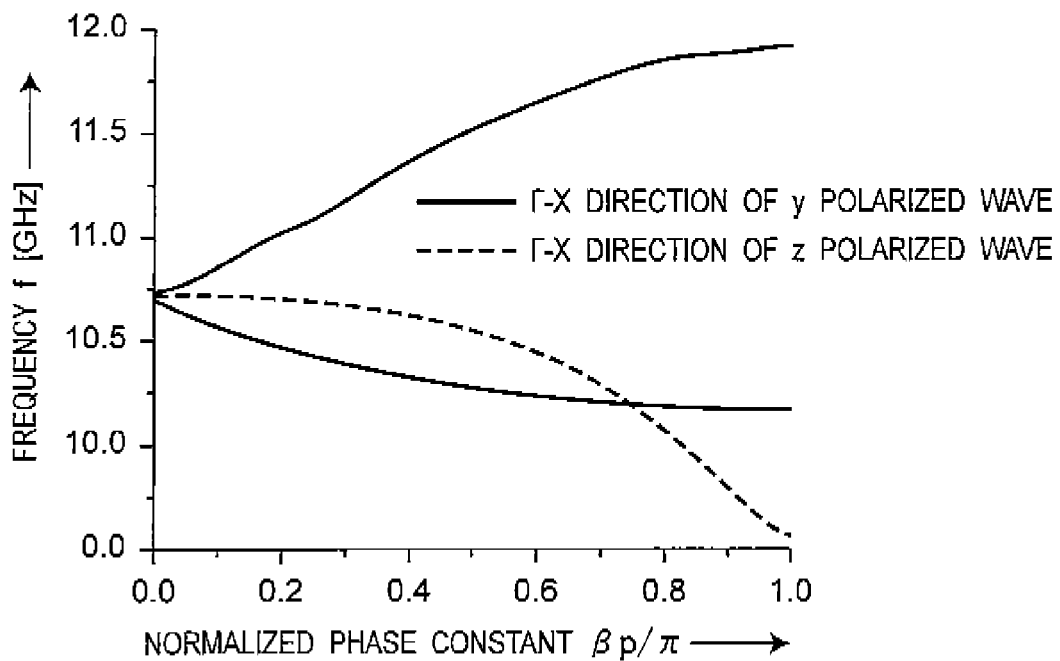

FIG. 13 is a graph showing dispersion frequency characteristics of the in-plane propagation extracted by the S parameters simulated in a case where the spherical dielectric 21 has a relative permittivity $\in_{DR}$=38, a dielectric medium 22 has a relative permittivity $\in_{BG}$=2.2, the spherical dielectric 21 has a diameter "a"=4.8 mm, one side has a length "p"=7 mm, the dielectric layer 13 has a height "d"=6 mm, the conductive mesh plate 11 has a thickness "t"=9.0 μm, a square hole 12 has a one-side length "w"=2.6 mm in the unit cell 10a of FIG. 12.

Figure 14:
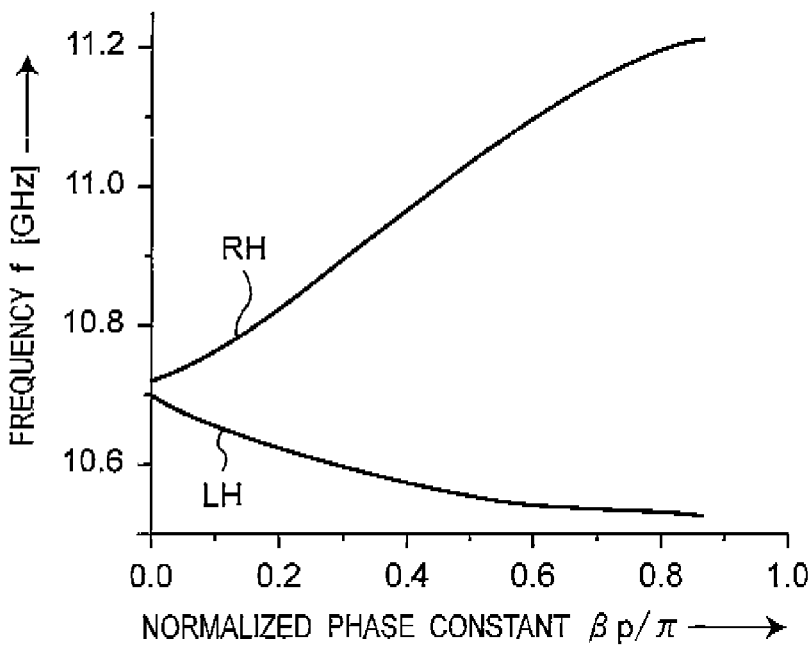

FIG. 14 is a graph showing dispersion frequency characteristics of the propagation perpendicular to the conductive mesh plate 11 extracted by the S parameters simulated in the case where the spherical dielectric 21 has a relative permittivity $\in_{DR}$=38, the dielectric medium 22 has a relative permittivity $\in_{BG}$=2.2, the spherical dielectric 21 has a diameter "a"=4.8 mm, one side has a length "p"=7 mm, the dielectric layer 13 has a height "d"=6 mm, the conductive mesh plate 11 has a thickness "t"=9.0 μm, the square hole 12 has a one-side length "w"=2.6 mm in the unit cell 10a of FIG. 12.

Figure 15:
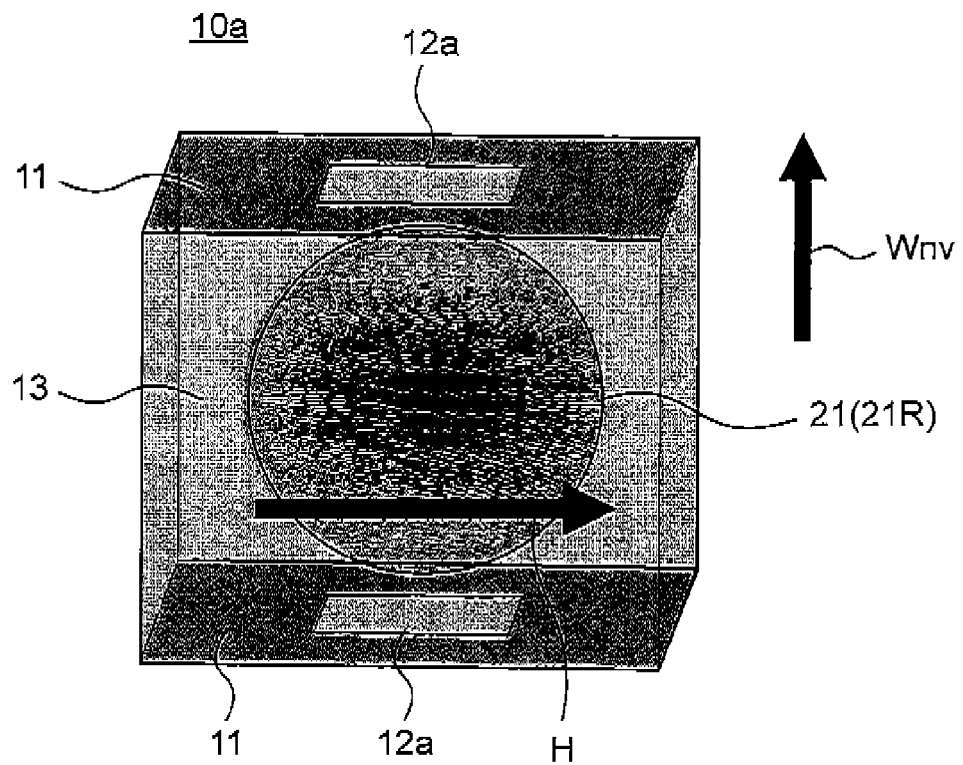

FIG. 15 is a schematic perspective view showing a magnetic field vector H and a wave number vector Wnv in the unit cell 10a in the case of FIG. 14.

Figure 16:
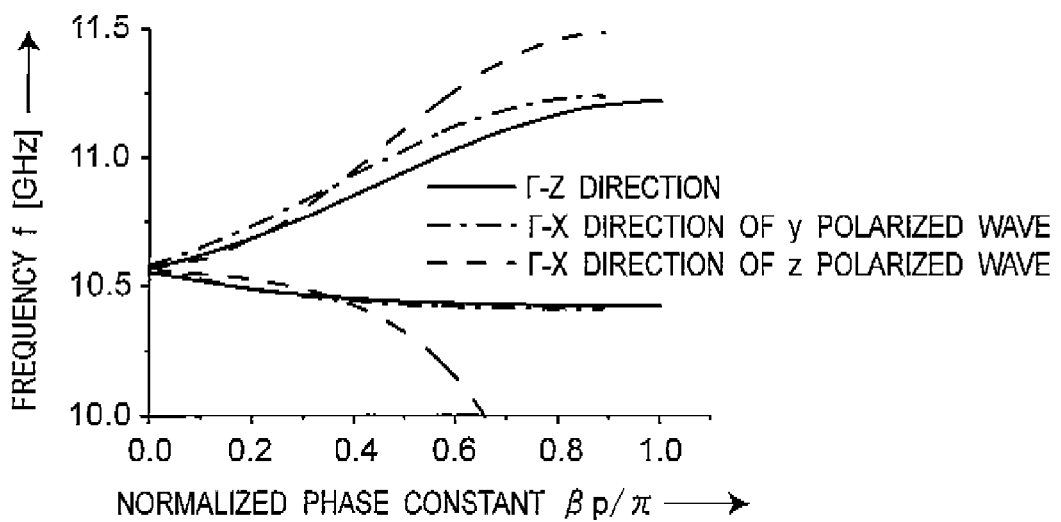

FIG. 16 is a graph showing dispersion frequency characteristics extracted by the S parameters simulated in a case where one side has a length "p"=9 mm, a columnar dielectric 20 has a relative permittivity $\in_{DR}$=37.5, the dielectric layer 13 has a height "d"=6 mm, the conductive mesh plate 11 has a thickness "t"=1.0 mm, and the conductive mesh hole 12 has a radius $r_w$=2.75 mm in the unit cell 10 in FIG. 2.

Figure 1:
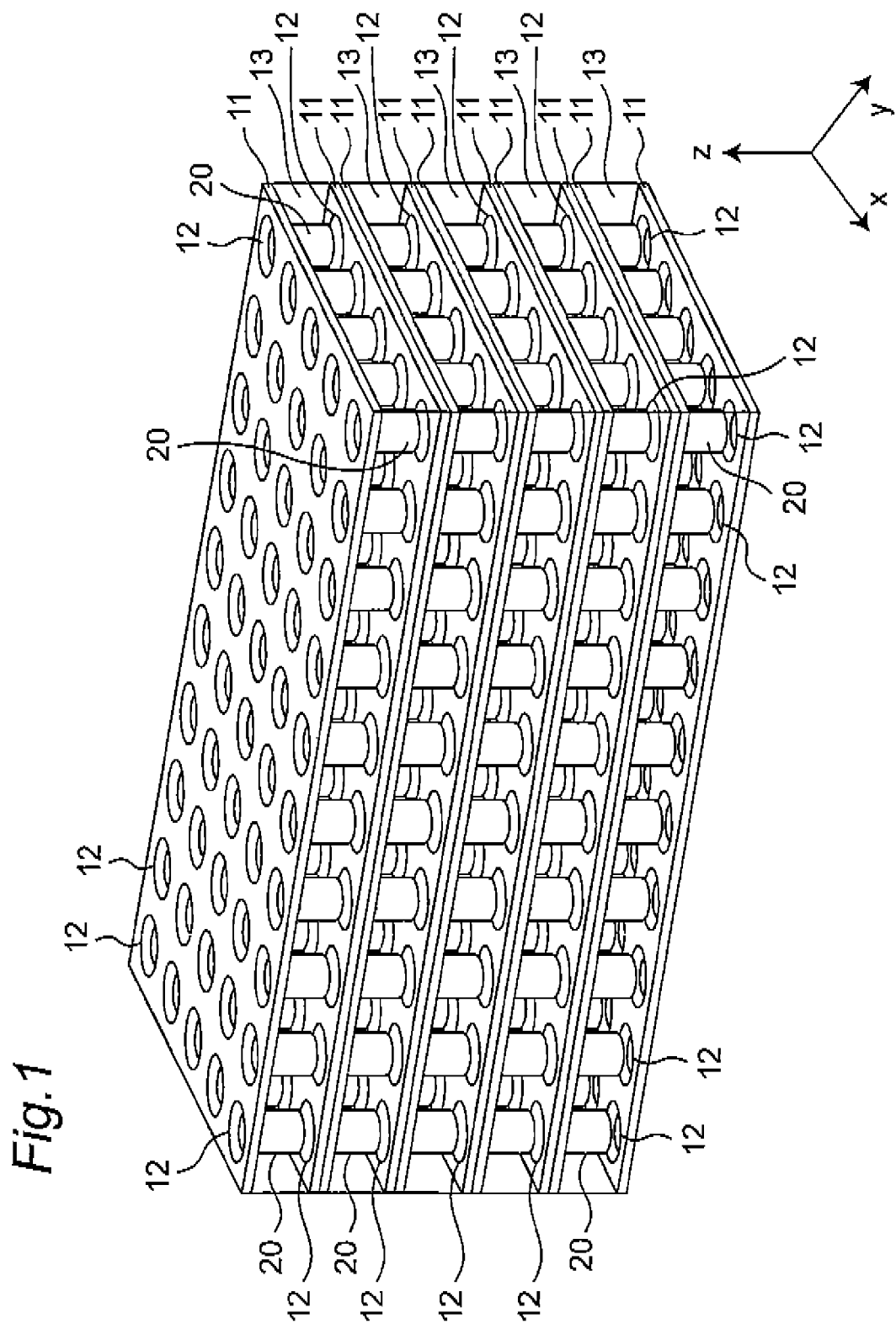
FIG. 1 is a perspective view showing a configuration of a three-dimensional composite right-handed/left-handed metamaterial according to one embodiment of the present invention.
Figure 17A:
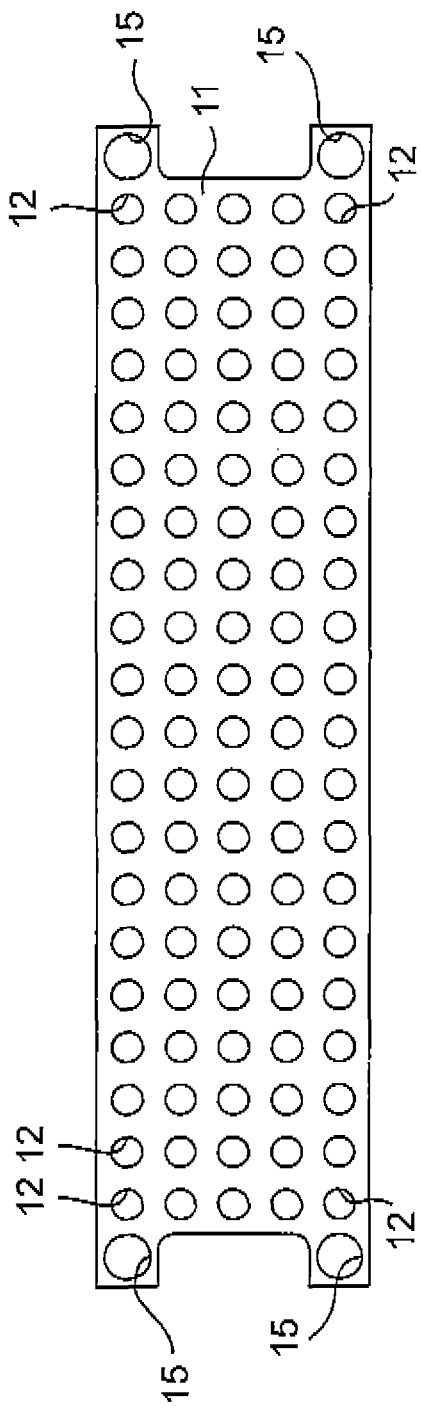

FIG. 17A is a plan view of the conductor mesh plate 11 of respective components or parts when a lens is experimentally produced by using the three-dimensional composite right-handed/left-handed metamaterial of FIG. 1.

Figure 17B:
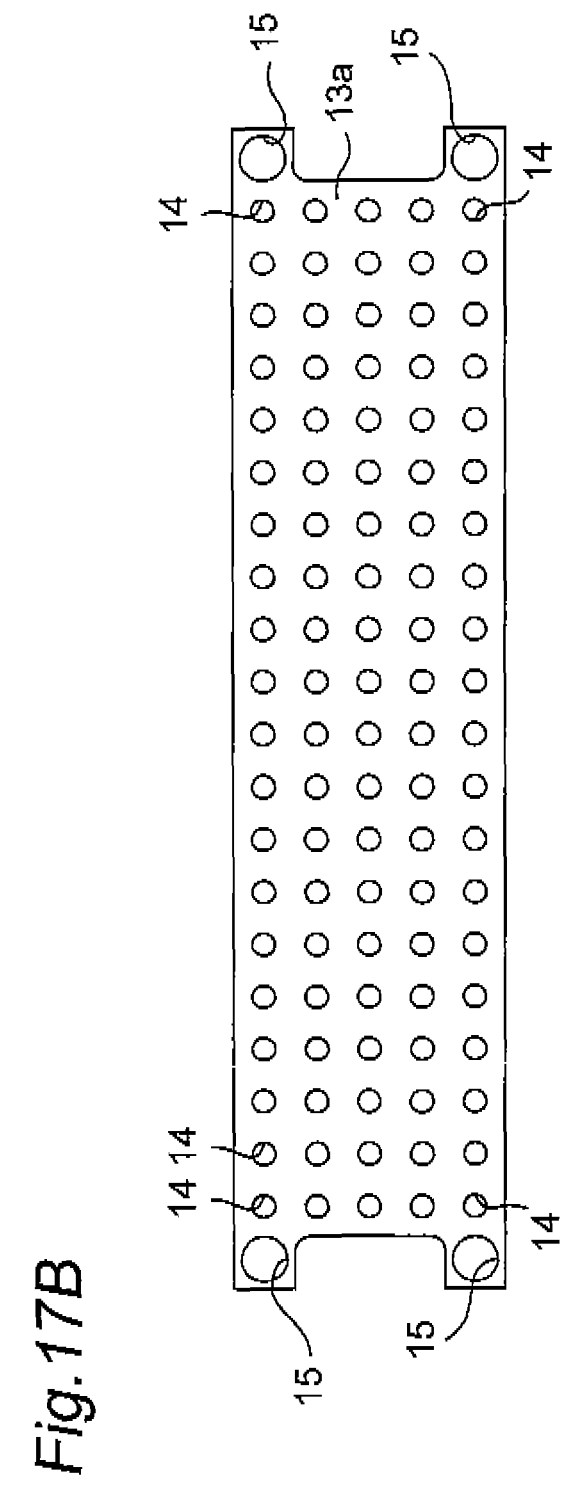

FIG. 17B is a plan view of a first dielectric layer 13a of respective components or parts when the lens is experimentally produced by using the three-dimensional composite right-handed/left-handed metamaterial of FIG. 1.

Figure 17C:
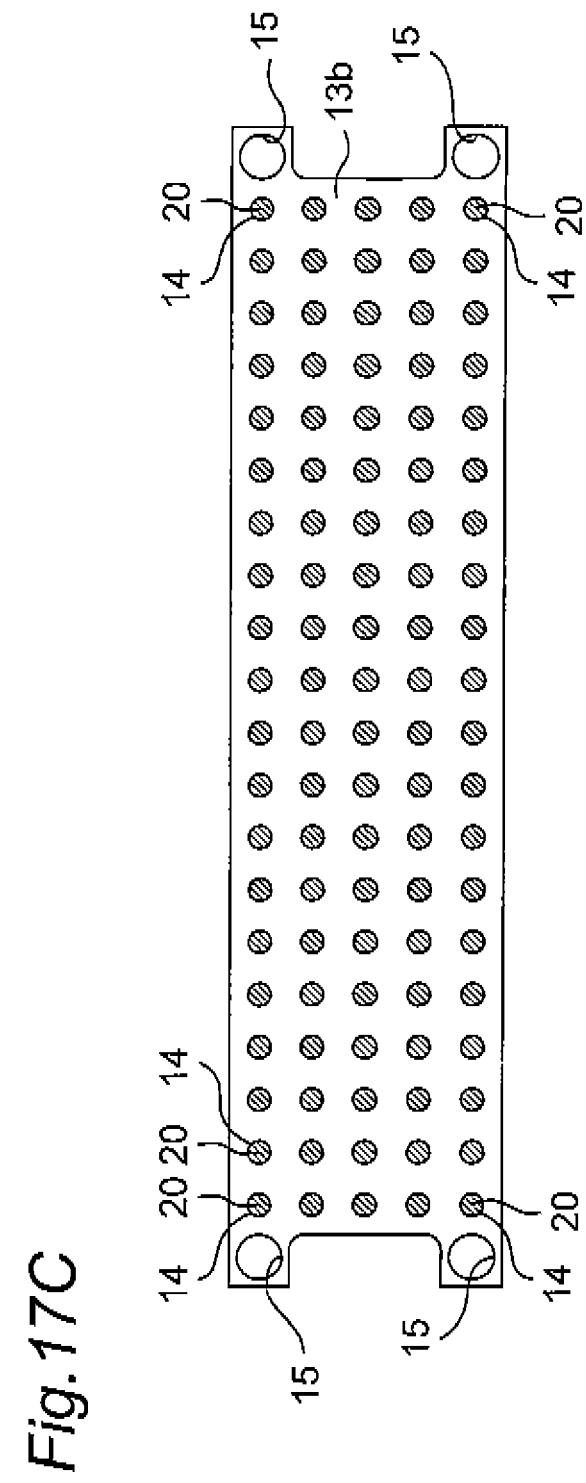

FIG. 17C is a plan view of a second dielectric layer 13b of respective components or parts when the lens is experimentally produced by using the three-dimensional composite right-handed/left-handed metamaterial of FIG. 1.

FIG. 18 is a schematic plan view showing a configuration of a measurement system for measuring the electromagnetic field pattern via the lens that uses the three-dimensional composite right-handed/left-handed metamaterial of FIG. 1.

Figure 19:
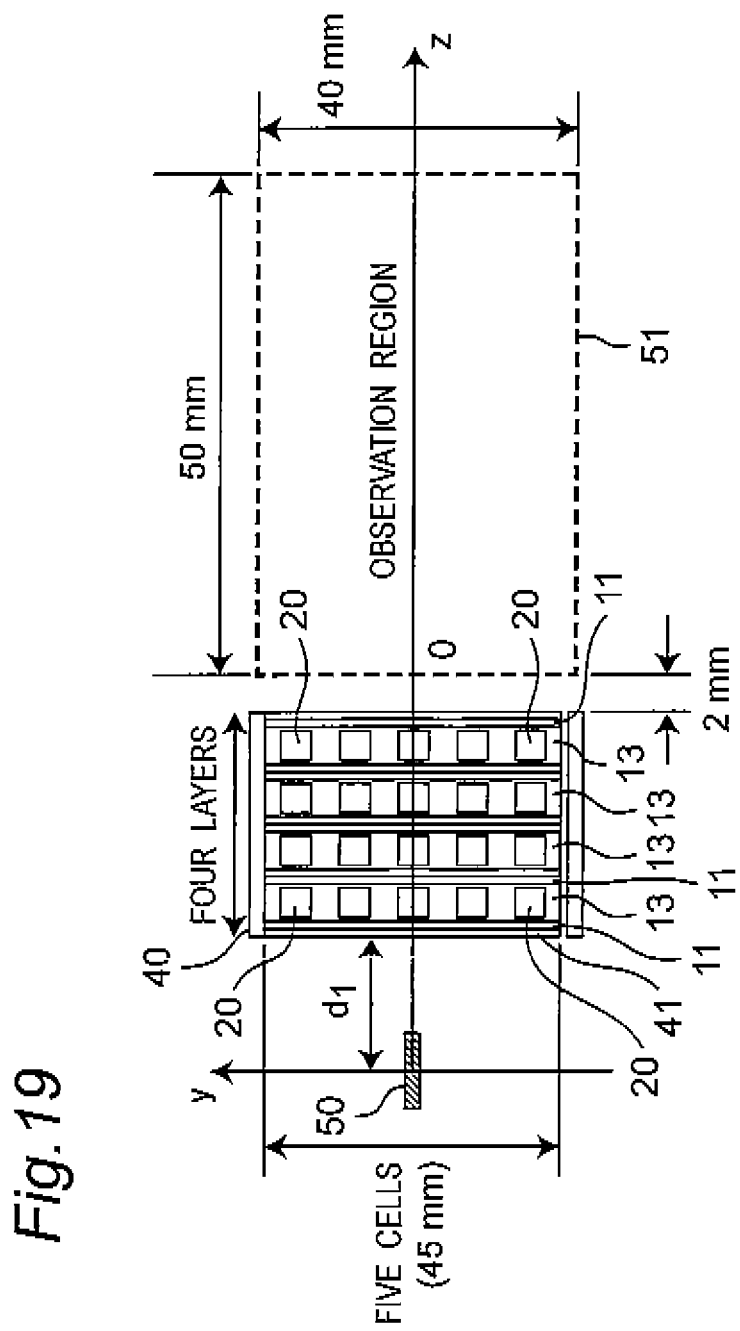

FIG. 19 is a schematic side view showing a configuration of the measurement system of FIG. 18.

Figure 20:
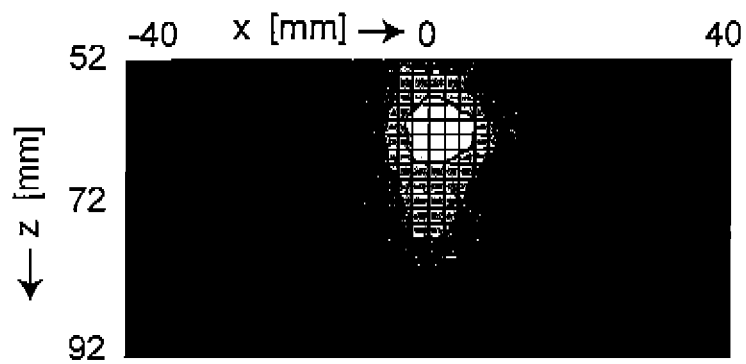

FIG. 20 is a distribution chart showing a profile of the magnitude of the magnetic field distribution of electromagnetic waves at a frequency of 10.46 GHz outputted from a lens that has a three-dimensional flat negative refractive index in the x-z plane in the measurement system shown in FIGS. 18 and 19.

Figure 21A:
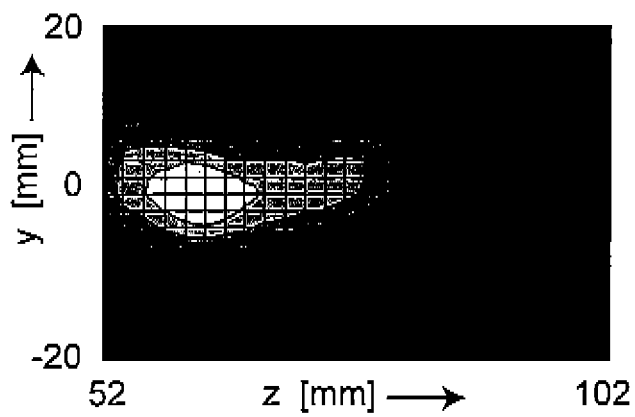

FIG. 21A is a distribution chart showing a magnitude of the magnetic field distribution of electromagnetic waves at the frequency of 10.46 GHz outputted from the lens in the y-z plane in the measurement system shown in FIGS. 18 and 19.

Figure 21B:
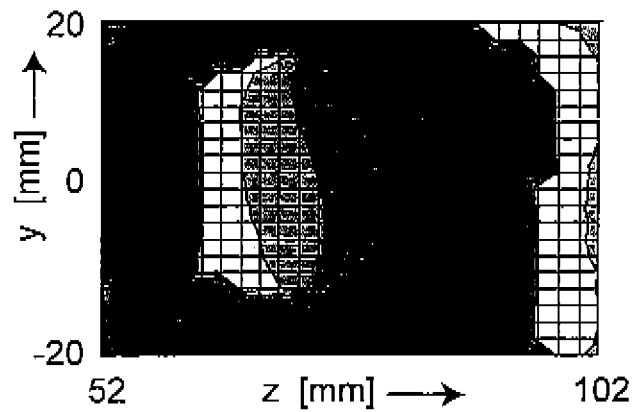

FIG. 21B is a distribution chart showing a phase of the magnetic field distribution of electromagnetic waves at the frequency of 10.46 GHz outputted from the lens in the y-z plane in the measurement system shown in FIGS. 18 and 19.

Figure 22A:
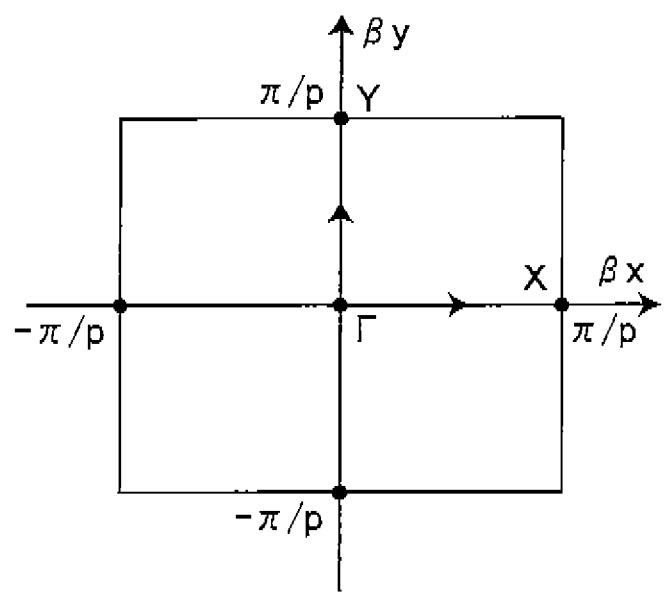

FIG. 22A is a diagram showing a relation between the x component and the y component of the wave number vector in the three-dimensional composite right-handed/left-handed metamaterial of the present embodiment.

Figure 22B:
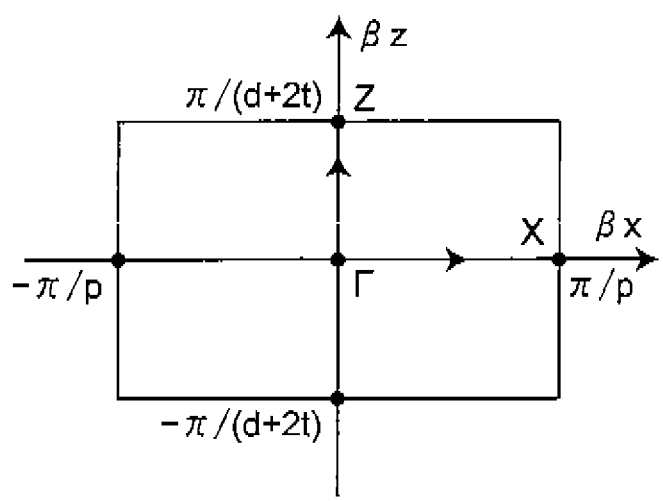

FIG. 22B is a diagram showing a relation between the x component and the z component of the wave number vector in the three-dimensional composite right-handed/left-handed metamaterial of the present embodiment.

DESCRIPTION OF EMBODIMENTS

Embodiments of the present invention will be described below with reference to the drawings. In the following embodiments, like components are denoted by like reference numerals.

Embodiments

FIG. 1 is a perspective view showing a configuration of a three-dimensional composite right-handed/left-handed metamaterial according to one embodiment of the present invention. FIG. 2 is a perspective view showing a configuration of the unit cell of the three-dimensional composite right-handed/left-handed metamaterial of FIG. 1.

In order to solve the problems of the aforementioned prior art, the embodiments of the present invention adopt a multi-layered structure that can be comparatively easily produced as a manufacturing method to actualize the three-dimensional structure of the composite right-handed/left-handed metamaterial including not only the left-handed system but also the right-handed metamaterial. In concrete, as shown in FIG. 1, there is provided a multi-layered structure in which the layers of dielectric layers 13 including a plurality of dielectric resonators 20R configured to include, for example, columnar dielectrics 20, and electrically conductive mesh plates 11 made of a metal are alternately multi-layered. That is, the composite metamaterial is configured by forming a functional layer including the plurality of dielectric resonators 20R by sandwiching the dielectric layer 13 that includes the plurality of columnar dielectrics 20 between a pair of conductive mesh plates 11 that have a plurality of circular holes 12 and by multi-layering a plurality of the functional layers. In this case, it is characterized in that the unit cell 10 of FIG. 2 is formed, which is particularly configured by forming the dielectric resonator 20R through sandwiching the dielectric 20 between a pair of conductive mesh plates 11 that have respective circular holes 12, and the unit cells 10 are aligned side by side to be adjacent to each other at predetermined intervals in two-dimensional directions parallel to the conductive mesh plates 11 and multi-layered in the direction perpendicular to the conductive mesh plates 11. Although the center axes of the circular holes 12, 12 are exactly or substantially aligned with the axes of the columnar dielectrics 20 in this case, the present invention is not limited to this, and the axes may be not aligned.

Comparison with Already Proposed Structure

A report concerning the multi-layered metamaterial structure configured to include the dielectric layers 13 including a plurality of dielectric resonators 20R and the conductive mesh plates 11 has already been made by the present inventor (See, for example, the Non-Patent Document 11). The already proposed structure is explained below for comparison of the embodiment of the present invention with the already proposed structure.

The already proposed structure is one of the resonant type metamaterials and adopts a two-dimensional arrangement of dielectric resonators to manage or change the effective permeability. That is, by using dielectric resonators in place of split ring resonators made of a metal, the effective permeability is configured to have a desired positive value, zero or a negative value. It is noted that the resonance configurations of the dielectric resonators are limited. Eddies of electric flux lines is formed in a plane parallel to the multi-layered structure, and an electromagnetic field distribution similar to a magnetic dipole having an axis of symmetry in a direction perpendicular to it is provided. Moreover, in order to change the effective permittivity, adjoining two metal mesh plates are used as a parallel-plate line. That is, by taking advantage of the fact that effective permittivity becomes negative in a frequency region in which the TE mode (propagation mode in which the electric field vector is parallel to the parallel plates) propagating along the parallel plate is below the cutoff frequency, the effective permittivity is configured to have a desired positive, zero or a negative value including operation in a band higher than the cutoff frequency. The mesh hole has been provided to increase the degree of freedom of design in adjusting the effective permittivity in the case of propagation parallel to the multi-layered structure. The multi-layered metamaterial employing the dielectric resonators is able to suppress the propagation loss to a comparatively low level because no metal is used in the resonator part that causes anti-resonance although a metal material is used in the mesh portion. Furthermore, a balanced composite right-handed/left-handed metamaterial such that the frequencies at which the effective permittivity and the effective permeability become zero are made to coincide with each other is also possible. However, since the operation as the composite right-handed/left-handed metamaterial is possible only in a case where the polarization (electric field vector) direction and the propagation direction are both parallel to the multi-layered plane and the degrees of freedom in the propagation direction is two-dimensional, it has a two-dimensional structure. On the other hand, a three-dimensional structure including the propagation characteristic in the perpendicular direction has not been achieved with the multi-layered structure.

In contrast to this, in the embodiment of the present invention, the following two conditions should be imposed on the aforementioned multi-layered structure in order to operate the metamaterial as the composite right-handed/left-handed metamaterial even in the case where electromagnetic waves are propagated not only in the parallel direction but also in the perpendicular direction with respect to the multi-layered structure. One is related to the operation of the dielectric resonator 20R, and another one is related to the conductive mesh plate 11.

The condition of the dielectric resonator 20R when the metamaterial operates as the three-dimensional metamaterial is that a first resonance configuration having an electromagnetic field distribution similar to the magnetic dipole moment with the axis of symmetry in the direction perpendicular to the multi-layered conductive mesh plates 11, and second and third resonance configurations having electromagnetic field components similar to the magnetic dipole moment with the axis of symmetry in a direction (degree of freedom of two) substantially parallel to the layer plane both take substantially identical resonance frequencies (different three resonant modes 1, 2 and 3 are substantially degenerate). As a result, when external electromagnetic waves having an operating frequency in the vicinity of the aforementioned resonant frequency are incident on the dielectric resonator 20R, the dielectric resonator 20R becomes such a state that it takes a resonant state or an electromagnetic field distribution close to the state regardless of the direction of the incident wave magnetic field vector. Moreover, the electromagnetic field distribution inside and outside the dielectric resonator 20R under the resonance is expressed as any one of the substantially degenerate three resonant modes or combinations (linear summation) of them depending on the direction of the incident wave magnetic field vector components. The above conditions are hereinafter referred to as a configurational condition.

In this case, the electromagnetic field distribution similar to the magnetic dipole moment indicates a state in which electric flux lines form closed concentric eddies within a plane perpendicular to a certain axis in the dielectric resonator 20R, while magnetic flux lines are directed in a direction substantially along the axis at and around the center and the lines of magnetic force spread also to the outside of the dielectric resonator 20R forming a closed curve. In general, the lines of magnetic force are solenoidal (necessarily closed), and therefore, the lines of magnetic force exhibit a distribution largely spreading to the outside of the dielectric resonator 20R in this case. The electrical energy is accumulated more than magnetic energy in the dielectric resonator 20R, and on the other hand, energy accumulated by the magnetic field becomes larger than energy accumulated by the electric field outside the dielectric resonator 20R, so that coupling between the dielectric resonator 20R and the outside electromagnetic field is predominated by the magnetic coupling. In the case of the columnar dielectric resonator 20R, (1) an electromagnetic field distribution similar to the magnetic dipole moment parallel to the axis of symmetry of the column takes place in the $TE_{01\delta}$ resonant mode and in the vicinity of the operating frequency, and (2) an electromagnetic field distribution similar to the magnetic dipole moment takes place in a direction perpendicular to the side surface of the column in the $HE_{11\delta}$ resonant mode and in the vicinity of the operating frequency. In this case, there are two degrees of freedom in taking the direction perpendicular to the side surface of the column, and therefore, it is herein presumed that two resonant states are degenerate. In the case where the resonance frequencies of the above items (1) and (2) are identical, it is possible to operate an electromagnetic field distribution similar to the magnetic dipole moment of a directional relation parallel to the spatially independent three different directions at an identical operating frequency.

In the case of a spheric dielectric resonator 21R according to a modified embodiment (described later with reference to FIGS. 12 to 16), a resonant mode is approximately calculated presuming a magnetic wall (tangential component of the magnetic field is zero) at the boundary on the assumption that the permittivity in the dielectric resonator 21R is sufficiently larger than that of the outside. In the thus simplified model, the electromagnetic field distribution in the $TE_{011}$ resonant mode corresponds to the aforementioned case.

In order to operate the metamaterial as the composite right-handed/left-handed metamaterial in the propagation direction perpendicular to the multi-layered structure, the circular hole 12 at the conductive mesh plate 11 is used as a metal cutoff waveguide. The electromagnetic waves propagating in the direction perpendicular to the conductive mesh plates 11 have a negative permittivity at and below the cutoff frequency in the region inside the circular hole 12 or have a positive effective permittivity in the region higher than the cutoff frequency. On the other hand, the effective permeability remains positive.

In this case, the dielectric resonator 20R is required to satisfy the aforementioned constitutional conditions. Therefore, although the concrete shape is not especially determined, there can be enumerated a sphere, a column, a cube and a quadrangular prism as simple ones as the shape of the dielectric 20. Moreover, other physical objects also include a spheroid, a triangular prism, a pentagonal prism, a polygonal prism and other somewhat deformed shapes. The physical objects of the dielectric resonator 20R have a very high permittivity compared to the surrounding host medium (or air) and also include not only the case of a single material but also the case of combinations of a plurality of materials. On the other hand, the dielectric medium 22 around the dielectric 20 may either be hollow or stuffed with a dielectric that has a permittivity sufficiently smaller than the permittivity of the dielectric 20 of the dielectric resonator 20R.

In order to operate the metamaterial as the composite right-handed/left-handed metamaterial in the propagation direction perpendicular to the multi-layered structure, the magnetic field vector of the incident waves on the dielectric resonator 20R included in the dielectric layer 13 needs to excite a resonant state that has an electromagnetic field component similar to the magnetic dipole moment parallel to the layer plane. As a result, the effective permeability is able to have a positive, zero or a negative value depending on the operating frequency in the region inside the dielectric layer 13. On the other hand, the effective permittivity has a positive value although it is increased by inserting the dielectric resonator.

Then, in order to operate the metamaterial particularly as the composite left-handed metamaterial in the propagation direction perpendicular to the multi-layered structure, it is required to make the circular hole 12 region portion have a negative permittivity and a positive permeability as described above and make the dielectric layer 13 region portion have a positive permittivity and a negative permeability as described above. Furthermore, the sizes of the regions need to be set so that the effective permittivity and permeability of the overall structure in which they are multi-layered both become negative.

Further, the frequencies at which the effective permittivity and permeability of the overall structure become zero in the propagation direction perpendicular to the multi-layered structure are generally different from each other, whereas, the metamaterial can also be operated as the balanced right-handed/left-handed metamaterial by making the frequencies coincide with each other.

Moreover, when electromagnetic waves have a polarization direction and a propagation direction in the direction parallel to multi-layered structure, the composite right-handed/left-handed metamaterial can be configured on the basis of the same principle as that of the already proposed structure.

Although the electromagnetic waves have the propagation direction in the plane parallel to the multi-layered structure, the TE mode cutoff operation by the conductive mesh plates 11 cannot be used in a case where the polarization direction is directed in the direction perpendicular to the layer. Therefore, it is required to achieve a negative effective permittivity by another method in order to operate the metamaterial as the left-handed metamaterial. As one method, it can be considered to utilize magnetic coupling between the dielectric resonators 20R. Since the magnetic mutual coupling between the dielectric resonators 20R takes a form such that only the inductive element is inserted into the parallel branch portion when it is expressed by the transmission line model, it consistently has a negative value, and does not operate as the right-handed metamaterial. This is described in detail with reference to FIG. 3C.

Next, the structure of an anisotropic three-dimensional composite right-handed/left-handed metamaterial configured by multi-layering the dielectric layers 13 that have the two-dimensional array of the conductive mesh plates 11 and the dielectric resonators 20R in the thickness direction according to the present embodiment is described below.

The present embodiment includes the case of in-plane propagation of electromagnetic waves that have polarization perpendicular to the layer plane. The circuit parameters of each case are extracted from the scattering parameters thereof, compared with the eigenmode solution, and compared with an equivalent circuit model from the physical viewpoint. Further, the beam focusing of electromagnetic waves that have passed through a negative refractive index lens was verified by using a loop antenna to obtain the time-varying magnetic dipole moment, as an input wave source, not only in the plane parallel to its axis but also in the plane that includes the perpendicular direction.

First of all, the geometrical structure of the three-dimensional composite right-handed/left-handed metamaterial is described below. The geometrical structure and the coordinate system of the structure of the proposed three-dimensional composite right-handed/left-handed metamaterial are shown in FIGS. 1 and 2. The present structure is fundamentally similar to the already proposed multi-layered type metamaterial (See, for example, the Non-Patent Document 11) and is a multi-layer structure configured to include the conductive mesh plates 11 and the dielectric layer including the two-dimensional array of the dielectric resonators 20R configured to include the columnar dielectrics 20 as shown in FIG. 1. The unit cell 10 shown in FIG. 2 is configured to include a pair of mutually parallel conductive mesh plates 11 having a thickness "t", a dielectric layer 13 including a dielectric medium 22 (mentioning the dielectric medium around the columnar dielectric 20) having a thickness "d" and a relative permittivity $\in_{BG}$, and the dielectric resonator 20R of the columnar dielectric 20 having a relative permittivity $\in_{DR}$, a diameter "a" and a height "h". The columnar dielectric 20 is placed at the center of the unit cell 10, and its axis is perpendicular to the conductive mesh plates 11. The center of the open circular hole 12 having a radius $r_w$ at the conductive mesh plates 11 coincides exactly or substantially with the center axis of the columnar dielectric 20. The cross section of the unit cell 10 in the conductive mesh plate 11 is square in the present embodiment, and the length of one side is "p". The circular hole 12 of the conductive mesh plates 11 is hollow and filled with air.

Next, the fundamental operation and the equivalent circuit model are described below. The fundamental concept of the present circuit design is based on the composite right-handed/left-handed transmission line. The focal point of the present invention resides in the design of the effective permittivity and permeability of the structure of the concerned object, and this produces an appropriate configuration so that the propagating waves have the desired phase characteristics. In the present embodiment, which handles a three-dimensional structure, therefore needs to consider the polarization and the dependence of the propagation direction of incident waves with respect to the propagation characteristics. As easily estimated from the proposed geometrical structure shown in FIGS. 1 and 2, the wave motion in the present structure has a characteristic that is essentially anisotropic. According to the precedent researches (See, for example, the Non-Patent Document 11), the fact that a substantially isotropic characteristic could be achieved in the predetermined frequency region in a case where the polarization and the propagation direction were limited to the propagation in the two-dimensional region parallel to the conductive mesh plates 11. Accordingly, there are the following two problems that should be solved in order to achieve a characteristic of a small anisotropy concerning the structure of the three-dimensional composite right-handed/left-handed metamaterial.

(1) In the case of in-plane propagation, a refractive index difference appears depending on how to take the polarization direction, i.e., a difference between the parallel direction and the perpendicular direction with respect to the conductive mesh plates 11.

(2) An anisotropy exists depending on how to take the propagation direction, i.e., a difference in the propagation direction between the parallel direction and the perpendicular direction with respect to the conductive mesh plates 11.

In the present embodiment, the present inventor mainly handles the latter. That is, experiment is performed to reduce the anisotropy in both the parallel and perpendicular propagation directions with respect to the mesh plates as small as possible, whereas the polarization of electromagnetic waves (electric field) is limited to the inside of the mesh plates. It is noted that the problem of the former is also discussed concerning the difference in the propagation direction of in-plane propagation. In order to consider these problems, the following typical three cases, i.e., a case example I (propagation perpendicular to the layers) shown in FIGS. 4, 5 and 6, a case example II (propagation when both the polarization and propagation directions are in the plane), and a case example III (in-plane propagation having polarization perpendicular to the layers) are examined. FIGS. 3A, 3B and 3C show equivalent circuit models of the three cases.

FIGS. 3A, 3B and 3C are circuit diagrams showing equivalent circuit models of the unit cells of the composite right-handed/left-handed metamaterial of FIG. 1 proposed in the three different propagation cases. FIG. 3A is a circuit diagram showing an equivalent circuit model of the unit cell of the composite right-handed/left-handed metamaterial proposed in the first case (See FIG. 4) of propagation perpendicular to a plurality of layers multi-layered by using the $HE_{11\delta}$ resonant mode of the dielectric resonator 20R. FIG. 3B is a circuit diagram showing an equivalent circuit model (constituting the TE cutoff parallel-plate waveguide) of the unit cell of the composite right-handed/left-handed metamaterial proposed in the second case (See FIG. 5) of propagation in the x direction of y polarized wave using the $TE_{01\delta}$ resonant mode of the dielectric resonator 20R. FIG. 3C is a circuit diagram showing an equivalent circuit model of the unit cell of the left-handed metamaterial proposed in the third case (See FIG. 6) of in-plane propagation of z polarized wave using the $HE_{11\delta}$ resonant mode of the dielectric resonator 20R. In FIGS. 3A, 3B and 3C, T1 and T2 denote terminals. In this case, FIG. 3B also includes the case of propagation in the y direction of x polarized wave using the $TE_{01\delta}$ resonant mode of the dielectric resonator 20R since equivalent operation is performed because of the structural symmetrical property. More generally speaking, FIG. 3B is a circuit diagram showing an equivalent circuit model of the unit cell of the composite right-handed/left-handed metamaterial proposed in the second case that has the propagation direction and the polarization direction within the plane (xy plane) using the $TE_{01\delta}$ resonant mode of the dielectric resonator 20R. FIG. 4 is a schematic longitudinal sectional view of the unit cell 10 showing an input electric field vector E and a magnetic field distribution including an excitation magnetic field vector H in the resonator in the first case of FIG. 3A. FIG. 5 is a schematic longitudinal sectional view of the unit cell 10 showing an input electric field vector E and a magnetic field distribution including the excitation magnetic field vector H in the second case of FIG. 3B. FIG. 6 is a schematic longitudinal sectional view of the unit cell 10 showing an input electric field vector E and a magnetic field distribution including the excitation magnetic field vector H in the third case of FIG. 3C.

First of all, for the reason that the fundamental mechanism is the same as in the case of the precedent researches (See, for example, the Non-Patent Document 11), discussion is started from the examination of the case example II in which both the polarization and propagation directions are parallel to the conductive mesh plates 11. The equivalent circuit model is shown in FIG. 3B. The effective permeability of the present structure is controlled by the $TE_{01\delta}$ resonance of the dielectric resonator 20R of the columnar dielectric 20. A typical magnetic field distribution at a frequency close to resonance is shown in FIG. 5. The frequency region having negative and positive effective permeabilities can be controlled by the density of the dielectric resonator (See, for example, the Non-Patent Document 12). In contrast to this, the effective permittivity can be changed by appropriately adjusting the constitutive parameters of the TE cutoff parallel-plate waveguide by designing or the like of a distance between the mesh plates and the hole size of the conductive mesh plates 11 (See, for example, the Non-Patent Document 10). As a result, the designing of the balanced composite right-handed/left-handed metamaterial becomes possible.

Next, the propagation perpendicular to the layers (Case example I) is described below. In the case of the wave motion perpendicular to the layers, as shown in FIG. 3A, the positive and negative effective permeabilities are designed by using the $HE_{11\delta}$ resonant mode of the dielectric resonator 20R of the columnar dielectric 20. The height and the diameter of dielectric resonator 20R are set to be substantially identical so that the aforementioned $TE_{01\delta}$ and $HE_{11\delta}$ modes are degenerate at an identical operating frequency. In contrast to this, upon designing the effective permittivity of the present structure, the unit cell 10 can be separated into two sections, i.e., the section of the dielectric layer 13 including the dielectric resonator 20R and the section of the circular hole 12 of the conductive mesh plates 11. Although the effective permittivity of the former section is consistently positive, the propagation via a gap hole is below the cutoff region. Therefore, the net parallel branch admittance in the equivalent circuit model of the unit cell 10 produces positive and negative permittivities for the present structure. If both of the frequencies of the zero permittivity and zero permeability are made to coincide with each other by adjusting the constitutive parameters, the structure of the balanced composite right-handed/left-handed metamaterial can be designed concerning the propagation in the direction perpendicular to the plane of layers.

Further, the in-plane propagation having polarization perpendicular to the layers (Case example III) is described below. Regarding this item, as shown in FIG. 3C, the in-plane propagation of electromagnetic waves having polarization perpendicular to the layers is considered. In the case of the incident waves as described above, the dielectric resonator 20R behaves like the $HE_{11\delta}$ resonant mode in the vicinity of the concerned frequency region. In contrast to this, no mechanism concerning the TE cutoff waveguide exists in the case of this propagation. Eventually, mutual coupling between the dielectric resonators in the resonant state like $HE_{11\delta}$ contributes to the configuration of the left-handed transmission line (See, for example, the Non-Patent Documents 8 and 9). The equivalent circuit model of the unit cell 10 is shown in FIG. 3C. It can be understood that the mutual coupling does not support the right-handed mode although it supports the left-handed mode. This can be explained by the existence of the sole inductor element in the parallel branch, and this fact is confirmed later from numerical simulation results.

First Implemental Example

In the first implemental example, a dispersion characteristic diagram and extracted circuit parameters are described below. In the present item, several examples of dispersion characteristic diagrams that are numerically obtained concerning the structure of the proposed three-dimensional composite right-handed/left-handed metamaterial are shown. The constitutive parameters used for the numerical simulations are as follows. The diameter, the height and the permittivity of the columnar dielectric 20 of the dielectric resonator 20R are "a"=4.24 mm, h=4.3 mm, and a relative permittivity $\in_{DR}$=38, respectively. The relative permittivity of the dielectric medium 22 in the dielectric layer 13 is 2.2.

FIG. 22A is a diagram showing a relation between the x component and the y component of the wave number vector in the three-dimensional composite right-handed/left-handed metamaterial of the present embodiment, and FIG. 22B is a diagram showing a relation between the x component and the z component of the wave number vector in the three-dimensional composite right-handed/left-handed metamaterial of the present embodiment. In FIGS. 22A and 22B, βx, βy and βz denote the x, y and z direction components of the wave number (phase constant) vector, respectively. Only the component βx becomes non-zero in the case of the propagation in the x direction, or only the component βy and the component βz become non-zero in the case of the propagation in the y direction and the propagation in the z direction, respectively. As shown in FIGS. 7A, 7B and 7C, Γ represents the origin in the three-dimensional wave number (phase constant) region, X is a point at the boundary of a first Brillouin region representing (βx, βy, βz)=(π/p, 0, 0), and Z represents the point at (βx, βy, βz)=(0, 0, π/(d+2t)). The magnitude of the phase constant is collectively expressed by β. As apparent from FIG. 22A, the propagation characteristic on a line that connects the point Γ with the point X in the wave number region and the propagation characteristic on a line that connects the point Γ with the point Y can be regarded as identical from the symmetric property of the geometrical structure. Therefore, a case of propagation only in the x direction is presumed, and Γ-X is indicated below.

FIG. 7A is a graph showing dispersion frequency characteristics (frequency characteristics of a normalized phase constant $\beta p/\pi$) in a case where the dielectric layer 13 has a height "d"=6 mm, the conductive mesh plate 11 has a thickness "t"=0.5 mm, one side has a length "p"=8 mm, and a conductive mesh hole 12 has a radius $r_{w'}$=2.1 mm in the unit cell 10 of the three-dimensional balanced composite right-handed/left-handed metamaterial of FIG. 2. FIG. 7B is a graph showing dispersion frequency characteristics (frequency characteristics of the normalized phase constant $\beta p/\pi$) in a case where the dielectric layer 13 has a height "d"=6 mm, the conductive mesh plate 11 has a thickness "t"=0.5 mm, one side has a length "p"=9 mm, and the conductive mesh hole 12 has a radius $r_{w'}$=2.6 mm in the unit cell 10 of the three-dimensional balanced composite right-handed/left-handed metamaterial of FIG. 2. FIG. 7C is a graph showing dispersion frequency characteristics (frequency characteristics of the normalized phase constant $\beta p/\pi$) in a case where the dielectric layer 13 has a height "d"=6 mm, the conductive mesh plate 11 has a thickness "t"=0.5 mm, one side has a length "p"=11 mm, and the conductive mesh hole 12 has a radius $r_{w'}$=3.15 mm in the unit cell 10 of the three-dimensional balanced composite right-handed/left-handed metamaterial of FIG. 2.

As apparent from FIGS. 7A, 7B and 7C, the balanced composite right-handed/left-handed metamaterial structure can be configured not only in the case where both the polarization and propagation directions are in the plane (propagation in the Γ-X direction of y polarized wave) but also in the case of perpendicular propagation (propagation in the Γ-Z direction). Further, the composite right-handed/left-handed band of the propagation along the z axis becomes narrower as the period size is smaller. In contrast to this, the right-handed/left-handed band of y polarized wave in the direction in which the propagation direction is along the x axis becomes larger as the period is smaller. In the case of the present constitutive parameters, it can be understood that the phase constant becomes substantially the same in the small phase constant region in the case where one side has a length "p"=9 mm as shown in FIG. 7B by comparison to the propagation characteristics when the propagation directions are both perpendicular and parallel to the layers. In this case, a substantially isotropic characteristic is achieved. If attention is paid to be limited to these dispersion characteristic diagrams, the result of FIG. 7B seems to indicate an isotropy in the vicinity of the F point. However, it can be understood that it is remarkably anisotropic from the viewpoint of impedance as described later.

Next, before the impedance of the anisotropic characteristic is shown, circuit parameters extracted from scattering parameters by simulations are shown in FIGS. 8, 9A, 9B and 9C by the three different propagation cases. FIG. 8 is a circuit diagram of a symmetric π type equivalent circuit showing a series branch element and a parallel branch element of the unit cell 10 of the three-dimensional balanced composite right-handed/left-handed metamaterial of FIG. 2. FIG. 9A is a graph showing normalized values of the series branch element (effective series inductance Leff) and the parallel branch element (effective parallel capacitance Ceff/2) of the propagation in the direction perpendicular to the plurality of layers multi-layered in a case where one side has a length "p"=9 mm, the dielectric layer 13 has a height "d"=6 mm, the conductive mesh plate 11 has a thickness "t"=0.5 mm, and the conductive mesh hole 12 has a radius $r_{w'}$=2.6 mm in the symmetric π type equivalent circuit of the unit cell 10 of FIG. 8. FIG. 9B is a graph showing normalized values of the series branch element (effective inductance Leff) and the shunt branch element (effective capacitance Ceff/2) of the in-plane propagation (in the x direction) of y polarized wave in a case where one side has a length "p"=9 mm, the dielectric layer 13 has a height "d"=6 mm, the conductive mesh plate 11 has a thickness "t"=0.5 mm, and the conductive mesh hole 12 has a radius $r_{w'}$=2.6 mm in the symmetric π type equivalent circuit of the unit cell 10 of FIG. 8. FIG. 9C is a graph showing normalized values of the series branch element (effective inductance Leff) and the shunt branch element (effective capacitance Ceff/2) of the in-plane propagation of z polarized wave in a case where one side has a length "p"=9 mm, the dielectric layer 13 has a height "d"=6 mm, the conductive mesh plate 11 has a thickness "t"=0.5 mm, and the conductive mesh hole 12 has a radius $r_{w'}$=2.6 mm in the symmetric π type equivalent circuit of the unit cell 10 of FIG. 8.

In this case, Leff and Ceff denote the effective inductance in the series branch and the capacitance in the parallel branch of the π type equivalent circuit of the unit cell 10 as shown in FIG. 8. These parameters respectively correspond to the effective permeability and the effective permittivity. The parameter extraction method is the same as, for example, that of the one described in the Non-Patent Document 10. In FIGS. 9A and 9B, anti-resonance is perceived in the effective series inductance Leff at the frequency of 10.3 GHz as estimated by the equivalent circuit model in FIGS. 3A and 3B. Regarding the case example III, as apparent from FIG. 9C, it can be understood that the present structure cannot have the right-handed mode in the frequency region of the concerned object for the reason that the effective parallel capacitance Ceff is consistently negative. Further, such an interesting fact that the magnetic resonance of the dielectric resonator 20R contributes to the effective permeability is obtained from FIG. 9C although no anti-resonance is observed in the effective series inductance Leff at a frequency lower than 10.5 GHz. This result can be explained by the equivalent circuit model of mutual coupling between the dielectric resonators 20R in FIG. 3C.

Next, FIGS. 10A and 10B show propagation characteristics extracted by the scattering parameters of the composite right-handed/left-handed metamaterial structure of one unit cell 10. That is, FIG. 10A is a graph showing dispersion frequency characteristics obtained by imposing a periodic boundary condition on the circuit parameters extracted by the S parameters simulated in the case where one side has a length "p"=9 mm, the dielectric layer 13 has a height "d"=6 mm, the conductive mesh plate 11 has a thickness "t"=0.5 mm, and the conductive mesh hole 12 has a radius $r_{w'}$=2.6 mm in the unit cell 10 of FIG. 2. FIG. 10B is a graph showing frequency characteristics of Bloch impedance obtained by imposing a periodic boundary condition on the circuit parameters extracted by the S parameters simulated in the case where one side has a length "p"=9 mm, the dielectric layer 13 has a height "d"=6 mm, the conductive mesh plate 11 has a thickness "t"=0.5 mm, and the conductive mesh hole 12 has a radius $r_{w'}$=2.6 mm in the unit cell 10 of FIG. 2.

In FIG. 10A, the dispersion characteristic diagram obtained by the parameter extraction is compared with an eigenmode solution. FIG. 10B shows a Bloch impedance. It can be understood from FIG. 10B that the impedance of Γ-Z direction propagation is smaller than one third in comparison with the impedance in the case of y polarized wave of the Γ-X direction propagation. Further, the impedance of the Γ-X direction propagation of z polarized wave is far smaller than the other two impedances. Further, it can be understood that the ratio of the thickness t of the conductive mesh plate 11 to the thickness d of the dielectric layer 13 should be higher in order to reduce the anisotropy of the impedance from the results of performed numerical simulations.

FIG. 11 is a graph showing frequency characteristics of Bloch impedance extracted from the calculation result of the S parameters in the case where one side has a length "p"=9 mm, the dielectric layer 13 has a height "d"=6 mm, the conductive mesh plate 11 has a thickness "t"=1.0 mm, and the conductive mesh hole 12 has a radius $r_w$=2.95 mm in the unit cell 10 of FIG. 2. As apparent from FIG. 11, the constitutive parameters are the same as those of FIGS. 10A and 10B except for the thickness "t"=1 mm of the conductive mesh plate 11 and the radius $r_w$=2.95 mm of the conductive mesh hole 12. However, a smaller anisotropy was obtained between the impedances in the two case examples I and II. In this case, the impedance of the Γ-Z direction propagation is about a half of the impedance of Γ-X direction propagation of y polarized wave.

Second Implemental Example

FIG. 12 is a perspective view showing a configuration of the unit cell 10a of a three-dimensional composite right-handed/left-handed metamaterial that employs a spherical dielectric 21 according to a second implemental example (modified embodiment) of the present invention. FIG. 13 is a graph showing dispersion frequency characteristics of in-plane propagation obtained by imposing a periodic boundary condition on the circuit parameters extracted from the numerical calculation results of the S parameters in a case where the spherical dielectric 21 has a relative permittivity $\in_{DR}$=38, the dielectric medium 22 has a relative permittivity $\in_{BG}$=2.2, the spherical dielectric 21 has a diameter "a"=4.8 mm, one side has a length "p"=7 mm, the dielectric layer 13 has a height "d"=6 mm, the conductive mesh plate 11 has a thickness "t"=9.0 μm, a square hole 12 has one side length "w"=2.6 mm in the unit cell 10a of FIG. 12. FIG. 13 shows dispersion curves in the case of in-plane propagation (in the x direction) with respect to the multi-layered structure among the dispersion characteristics of the second implemental example when the spherical dielectric 21 is combined with the conductive mesh plates 11. The propagation characteristic largely varies depending on which of the y direction and the z direction the polarization direction is taken. In a frequency band lower than the frequency of 10.7 GHz, propagation in the left-handed mode can be achieved in either case. On the other hand, it is indicated that propagation in the right-handed mode is possible only in the case of polarization (in the y direction) parallel to the conductive mesh plates 11 in the frequency band higher than the frequency of 10.7 GHz.

FIG. 14 is a graph showing dispersion frequency characteristics of propagation perpendicular to the conductive mesh plates 11 extracted from the numerical calculation results of the S parameters in a case where the spherical dielectric 21 has a relative permittivity $\in_{DR}$=38, the dielectric medium 22 has a relative permittivity $\in_{BG}$=2.2, the spherical dielectric 21 has a diameter "a"=4.8 mm, one side has a length "p"=7 mm, the dielectric layer 13 has a height "d"=6 mm, the conductive mesh plate 11 has a thickness "t"=9.0 μm, the square hole 12 has one side length "w"=2.6 mm in the unit cell 10a of FIG. 12. FIG. 15 is a schematic perspective view showing a magnetic field vector H and a wave number vector Wnv in the unit cell 10a in the case of FIG. 12. FIG. 14 shows the fact that a balanced composite right-handed/left-handed line is configured in the case of propagation in the direction perpendicular to the multi-layered structure. That is, FIG. 14 shows the fact that excitation in the left-handed mode is possible in the frequency band lower than the frequency of 10.7 GHz and excitation in the right-handed mode is possible in the frequency band higher than the frequency of 10.7 GHz.

Third Implemental Example

In the third implemental example, demonstration of a negative refractive index lens is described below. In order to experimentally verify not only the in-plane propagation but also the operation of left-handed transmission with respect to the propagation in the direction perpendicular to the layers, a flat lens of a negative refractive index (See, for example, the Non-Patent Document 14) was designed and produced. The constitutive parameters of the unit cell 10 produced in the composite right-handed/left-handed metamaterial structure are as follows. The diameter, the height and the relative permittivity of the columnar dielectric 20 of the dielectric resonator 20R are respectively "a"=4.24 mm, "h"=4.3 mm, and $\in_{DR}$=37.5. The relative permittivity of the dielectric medium 22 in the dielectric layer 13 is 2.2. The unit cell 10 has one side length "p"=9.0 mm, mutually adjacent conductive mesh plates 11 have a spacing distance "d"=6.0 mm, the conductive mesh plate 11 has a thickness "t"=1 mm, and the conductive mesh hole 12 has a radius $r_w$=2.75 mm. FIG. 16 shows a corrected dispersion characteristic diagram.

FIG. 16 is a graph showing dispersion frequency characteristics obtained by imposing a periodic boundary condition on circuit parameters extracted from the numerical calculation results of the S parameters in a case where one side has a length "p"=9 mm, the columnar dielectric 20 has a relative permittivity $\in_{DR}$=37.5, the dielectric layer 13 has a height "d"=6 mm, the conductive mesh plate 11 has a thickness "t"=1.0 mm, and the conductive mesh hole 12 has a radius $r_w$=2.75 mm in the unit cell 10 of FIG. 2.

FIGS. 17A, 17B and 17C are plan views showing respective components or respective parts when a lens is experimentally produced by using the three-dimensional composite right-handed/left-handed metamaterial of FIG. 1. FIG. 17A is a plan view of the conductor mesh plate 11, FIG. 17B is a plan view of a first dielectric layer 13a, and FIG. 17C is a plan view of a second dielectric layer 13b. The produced lens was configured to include the components 11, 13a and 13b that have dimensions of 45 mm×180 mm×6 mm as shown in FIGS. 17A, 17B and 17C. In this case, a plurality of dielectric slots 14 are formed at the first dielectric substrate 13a, and a plurality of dielectric slots 14 of the second dielectric substrate 13b that has the plurality of dielectric slots 14 having the same configuration as that of the first dielectric substrate 13a are stuffed with the dielectrics 20 that are inserted to protrude. The first dielectric substrate 13a and the second dielectric substrate 13b are fitted together or engaged in each other to form one dielectric layer 13 in a manner that the plurality of dielectric slots 14 of the first dielectric substrate 13a are stuffed with the protruding dielectrics 20 to be inserted. Next, the formed dielectric layer 13 is sandwiched between a pair of conductive mesh plates 11 to form one functional layer, and a plurality of the functional layers are multi-layered to thereby allow the three-dimensional composite right-handed/left-handed metamaterial to be configured. It is noted that the four corners of the components are support rod slots 15, and these components 11, 13a and 13b are supported by the support rod slots 15. It is noted that a Rogers RT/Duroid 5880 (Rogers RT/Duroid 5880) substrate having a relative permittivity of 2.2 and a loss tangent of 0.0009 was used as the dielectric substrates 13a and 13b for the dielectric medium 13 to support the dielectric resonators 20R of the columnar dielectrics 20. The thickness of the dielectric medium 13 was adjusted so that a total thickness became 6.0 mm by using the two dielectric substrates 13a and 13b and the center of the dielectric resonator 20R was placed at the center of the height of the dielectric medium 13.

FIG. 18 is a schematic plan view showing a configuration of a measurement system for measuring the electromagnetic field pattern via the lens that uses the three-dimensional composite right-handed/left-handed metamaterial of FIG. 1, and FIG. 19 is a schematic side view showing a configuration of the measurement system of FIG. 18. It is noted that the numeral 50 denotes a loop antenna for transmission, and the numeral 51 denotes an observation region.

The experimental setup of the measured values of the electromagnetic field distribution around the lens and the coordinate system are shown in FIG. 18. A normal to the lens is set to be along the z axis. The height and the width of the lens are five cells (45 mm) and 20 cells (180 mm), respectively, and the length is of four layers (32 mm). No matching is achieved between the designed structure and air, i.e., the impedance of the lens is far smaller than the impedance of air. Therefore, a dielectric film 41 for matching was inserted as a matching circuit on both the input side and the output side of the lens. In order to avoid the influence of the thickness of the lens along the y direction, a film-shaped absorber operating in the X band was inserted at the boundary between the present structure and the air region. The transmission antenna and the reception probe for measurement are each configured to include a small-size loop antenna 50. The axial directions of these loop antennas 50 were set identical. Two cases were measured, and the directivities of the axes of these loop antennas 50 are along the x axis or the y axis. A distance between the produced lens and the transmission antenna 50 was set to 16 mm. This corresponds to a half of the length of the lens.

FIG. 20 is a distribution chart showing a magnitude of the magnetic field distribution of electromagnetic waves of 10.46 GHz outputted from the lens that has a three-dimensional flat negative refractive index in the x-z plane in the measurement system shown in FIGS. 18 and 19. In the measurement system, the magnitude and the phase distribution in the output region of the electromagnetic waves that have passed through the fabricated flat lens were measured at a frequency of, for example, 10.46 GHz. A beam focusing was clearly observed at the frequency from the measured electromagnetic field distribution.

Moreover, FIG. 21A is a distribution chart showing a magnitude of the magnetic field distribution of the electromagnetic waves of 10.46 GHz outputted from the lens in the y-z plane in the measurement system shown in FIGS. 18 and 19, and FIG. 21B is a distribution chart showing the phase. That is, the magnitude and the phase distribution of the magnetic field distribution at 10.46 GHz in the y-z plane are shown in FIGS. 21A and 21B. In this case, the origin of the coordinate system was placed at the center of the loop antenna 50 for transmission. The maximum value of the magnetic field was observed when z=64 mm at 10.44 GHz. This corresponds well to the distance of 16 mm from the lens. The operating frequency of the produced lens corresponds well with the operating frequency estimated from FIGS. 21A and 21B.

As apparent from FIGS. 21A and 21B, a beam focusing was obviously confirmed in both the size having a small number of cells along the height of the lens and the phase distribution. In FIGS. 20, 21A and 21B, the operation that the beam spot deviates from the lens with an increase in the operating frequency verifies a reduction in the magnitude of the effective refractive index with the frequency, i.e., the left-handedness of the fabricated structure. Also, in the case of the measurement having the antenna axis along the x axis, a similar electromagnetic field distribution was obtained.

Action and Effect of Embodiments

As described above, a new configuration of the structure of the three-dimensional anisotropic composite right-handed/left-handed metamaterial has been proposed in the present embodiment. This is configured to include the conductive mesh plate layer and the dielectric layer including the two-dimensional array of the dielectric resonators. The balanced composite right-handed/left-handed transmission structure was designed for the propagation not only in the parallel direction to the layers but also the propagation in the perpendicular direction. The present structure was essentially anisotropic and had a polarization dependence on the wave motion. In the case of the incident waves having polarization parallel to the mesh plate, a comparatively small anisotropic propagation characteristic in the predetermined frequency region was achieved when the constitutive parameters are appropriately designed. A flat lens was produced on the basis of the designed composite right-handed/left-handed metamaterial structure. The negative refractive index lens was demonstrated to verify the propagation in the composite right-handed/left-handed metamaterial of the proposed anisotropic three-dimensional structure regarding not only the in-plane propagation but also the perpendicular direction propagation.

Further Modified Embodiments

Although the shape of the holes 12 and 12a of the conductive mesh plates 11 is circular or square in the aforementioned embodiment and modified embodiments, the present invention is not limited to this, and the shape may be oval, triangular, quadrangular or higher polygonal shape or combinations of them.

Although the two-dimensional square lattice is used as the method for arranging the mesh windows of the holes 12 and 12a in aforementioned embodiment or modified embodiments, the present invention is not limited to this, and it may be a triangular lattice, a quadrangular lattice, a hexagonal lattice, a woven bamboo lattice or other regular lattices.

Although the holes 12 and 12a of the conductive mesh plates 11 are hollow in the aforementioned embodiment or modified embodiments, the present invention is not limited to this, and the holes may be stuffed with an insulating material (dielectric material) that has a permittivity sufficient smaller than that of the dielectrics 20 and 21.

Although the shape of the dielectric resonators 20R and 21R is circular or spherical in the aforementioned embodiment and modified embodiments, the present invention is not limited to this, and the shape may be configured to include combinations of one kind or more than two kinds of a spheroid, a cube, a cylindrical column, a triangular prism, a quadrangular prism and higher pentagonal prisms.

Although the method for arranging the dielectric resonators 20R and 21R is the two-dimensional square lattice in the aforementioned embodiment or modified embodiments, the present invention is not limited to this, and it may be a triangular lattice, a quadrangular lattice, a hexagonal lattice, a woven bamboo lattice or other regular lattices.

INDUSTRIAL APPLICABILITY

As described in detail above, according to the three-dimensional metamaterial of the present invention, the three-dimensional metamaterial, which has a propagation loss smaller than in the prior art and is extremely easily manufactured and operable as a left-handed metamaterial in the propagation direction perpendicular to the layer plane by propagating electromagnetic waves in a propagation direction perpendicular to the layer plane in each functional layer, can be configured. In this case, a flat lens having a negative refractive index or the like can be manufactured by using the three-dimensional metamaterial. Moreover, applications to microwave circuits and their components and antennas, flat-plate super-lenses, near field imaging having a resolving power smaller than the wavelength, optical devices and their components of a cloaking technique or the like can be provided.

REFERENCE NUMERICALS 10, 10a: unit cell;
11: conductive mesh plate;
12: circular hole;
12a: square hole;
13: dielectric layer;
13a, 13b: dielectric substrate;
14: dielectric slot;
15: support rod slot;
20: columnar dielectric;
21: spherical dielectric;
20R, 21R: dielectric resonator;
22: dielectric medium;
41: dielectric film for matching;
50: loop antenna;
51: observation region;
E: electric field vector;
H: magnetic field vector;
Lmn, Lmi: magnetic coupling;
Wnw: wave number vector; and
T1, T2: terminal.

The invention claimed is:

1. A three-dimensional metamaterial configured by sandwiching a dielectric layer that includes a plurality of dielectrics aligned at predetermined intervals and a host medium between a pair of conductive mesh plates each of which has a plurality of holes, thereby forming a functional layer including a plurality of dielectric resonators corresponding to the plurality of dielectrics, and multi-layering the plurality of functional layers, wherein axes of the plurality of holes and axes of the plurality of dielectric resonators are arranged coaxially to each other, and wherein electromagnetic waves are propagated in a propagation direction perpendicular to a plane of layers in each of the functional layers, thereby allowing the metamaterial to operate as a left-handed metamaterial in the propagation direction perpendicular to the plane of the layers.

2. The three-dimensional metamaterial as claimed in claim 1, wherein a size of the plurality of holes is set so that the plurality of holes have a negative effective permittivity and a positive effective permeability under such a condition that the dielectrics becomes such a resonant state that the dielectrics have a magnetic dipole moment at least parallel to the plane of layers when electromagnetic waves are made incident on the plurality of dielectric resonators in a direction substantially perpendicular to the plane of layers via the plurality of holes at a predetermined operating frequency, wherein a shape, a size, relative permittivity and an interval of the dielectric resonators, a relative permittivity of the host medium, and a thickness of the dielectric layer are set so that the dielectric layers have a positive effective permittivity and a negative effective permeability under the condition at the operating frequency, and wherein the shape, the size, the relative permittivity and the interval of the dielectric resonators, the relative permittivity of the host medium, the thickness of the dielectric layer and a thickness of the conductive mesh plates are set so that the effective permittivity and the effective permeability of the metamaterial both become negative under the condition at the operating frequency.

3. The three-dimensional metamaterial as claimed in claim 1, wherein a unit cell is configured by forming a dielectric resonator by sandwiching the dielectric between a pair of conductive mesh plates each having a hole, and wherein a plurality of the unit cells are aligned at predetermined intervals in a two-dimensional direction parallel to the plurality of conductive mesh plates and multi-layered in a direction perpendicular to the conductive mesh plates.

4. The three-dimensional metamaterial as claimed in claim 3, wherein a plurality of holes are formed at a first dielectric substrate, wherein the dielectric is inserted to protrude and stuffed in a plurality of holes of a second dielectric substrate that has a plurality of holes having a configuration identical to that of the first dielectric substrate, wherein one of the dielectric layers is formed by fitting the first dielectric substrate into the second dielectric substrate so that the protruding dielectrics are inserted and stuffed respectively in the plurality of holes of the first dielectric substrate, wherein one of the functional layers is formed by sandwiching the formed dielectric layer between a pair of conductive mesh plates, and wherein a plurality of the functional layers are multi-layered.

5. The three-dimensional metamaterial as claimed in claim 1, wherein the metamaterial is configured, so that a frequency when the effective permeability thereof becomes zero is set to be equal to a frequency when the effective permittivity thereof becomes zero, in a propagation direction of electromagnetic waves which is a direction perpendicular to the conductive mesh plates, thereby operating the metamaterial as a balanced right-handed/left-handed metamaterial.

6. The three-dimensional metamaterial as claimed in claim 1, wherein a right-handed and composite left-handed metamaterial is configured by making electromagnetic waves incident so that the electromagnetic waves have a polarization direction and a propagation direction in a direction parallel to the conductive mesh plates.

7. The three-dimensional metamaterial as claimed in claim 1, wherein the plurality of dielectrics are aligned to be close to each other so that the mutually adjacent dielectrics in the dielectric layers are magnetically coupled with each other, thereby operating the metamaterial as a left-handed metamaterial even when electromagnetic waves are made incident into the metamaterial so that the electromagnetic waves have a propagation direction in a direction parallel to the conductive mesh plates and has a polarization in a direction perpendicular to the conductive mesh plates.

* * * * *

UNITED STATES PATENT AND TRADEMARK OFFICE
CERTIFICATE OF CORRECTION

PATENT NO. : 8,669,833 B2
APPLICATION NO. : 13/375945
DATED : March 11, 2014
INVENTOR(S) : Tetsuya Ueda It is certified that error appears in the above-identified patent and that said Letters Patent is hereby corrected as shown below:

Title Page

In item (73), in the name of the Assignee National University Corporation Kyoto "University" of Technology, Kyoto (JP) should read National University Corporation Kyoto -- Institute -- of Technology, Kyoto (JP).

Signed and Sealed this
Twenty-fourth Day of June, 2014

Michelle K. Lee
*Deputy Director of the United States Patent and Trademark Office*